US008010583B2

(12) United States Patent
Matsunaga

(10) Patent No.: US 8,010,583 B2
(45) Date of Patent: Aug. 30, 2011

(54) COMPUTER READABLE MEDIUM, DOCUMENT PROCESSING APPARATUS, AND DOCUMENT PROCESSING SYSTEM WITH SELECTIVE STORAGE

(75) Inventor: Hideki Matsunaga, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 350 days.

(21) Appl. No.: 12/057,422

(22) Filed: Mar. 28, 2008

(65) Prior Publication Data

US 2009/0063567 A1    Mar. 5, 2009

(30) Foreign Application Priority Data

Aug. 27, 2007   (JP) ................................. 2007-220202

(51) Int. Cl.
*G06F 7/00*   (2006.01)
(52) U.S. Cl. .......... 707/812; 382/100; 382/181; 358/1.6
(58) Field of Classification Search ........................ None
See application file for complete search history.

(56) References Cited

U.S. PATENT DOCUMENTS

| | | | | |
|---|---|---|---|---|
| 7,023,573 B2* | 4/2006 | Ohhashi et al. | ............. | 358/1.15 |
| 7,577,662 B2* | 8/2009 | Kasatani | ................. | 707/999.01 |
| 2003/0081263 A1* | 5/2003 | Satoh et al. | .................. | 358/412 |
| 2006/0265242 A1* | 11/2006 | Kashioka | .......................... | 705/1 |
| 2007/0183448 A1* | 8/2007 | Ochiai | .......................... | 370/463 |
| 2007/0271254 A1* | 11/2007 | Iglesia et al. | ...................... | 707/5 |
| 2008/0109457 A1* | 5/2008 | Arita et al. | .................... | 707/100 |

FOREIGN PATENT DOCUMENTS

| | | | |
|---|---|---|---|
| JP | 2002-222195 A | | 8/2002 |
| JP | 2005-208977 A | | 8/2005 |
| JP | 2006-285406 A | | 10/2006 |
| JP | 2007-148640 | * | 6/2007 |

* cited by examiner

*Primary Examiner* — Hosain T Alam
*Assistant Examiner* — Jieying Tang
(74) *Attorney, Agent, or Firm* — Sughrue Mion, PLLC

(57) ABSTRACT

A computer readable medium storing a program causing a computer to execute a process for performing an image processing, the process including: selecting a first storage location as a storage destination of an electronic document based on image information of the electronic document generated by reading a document to be stored; selecting a second storage location as a storage destination candidate of the electronic document; registering the electronic document to the first storage location; creating result information including information on the electronic document, the first storage location and the second storage location; allowing a user to instruct changing the storage destination of the electronic document from the first storage location to the second storage location; and registering the electronic document to the second storage location on the basis of the instruction.

8 Claims, 25 Drawing Sheets

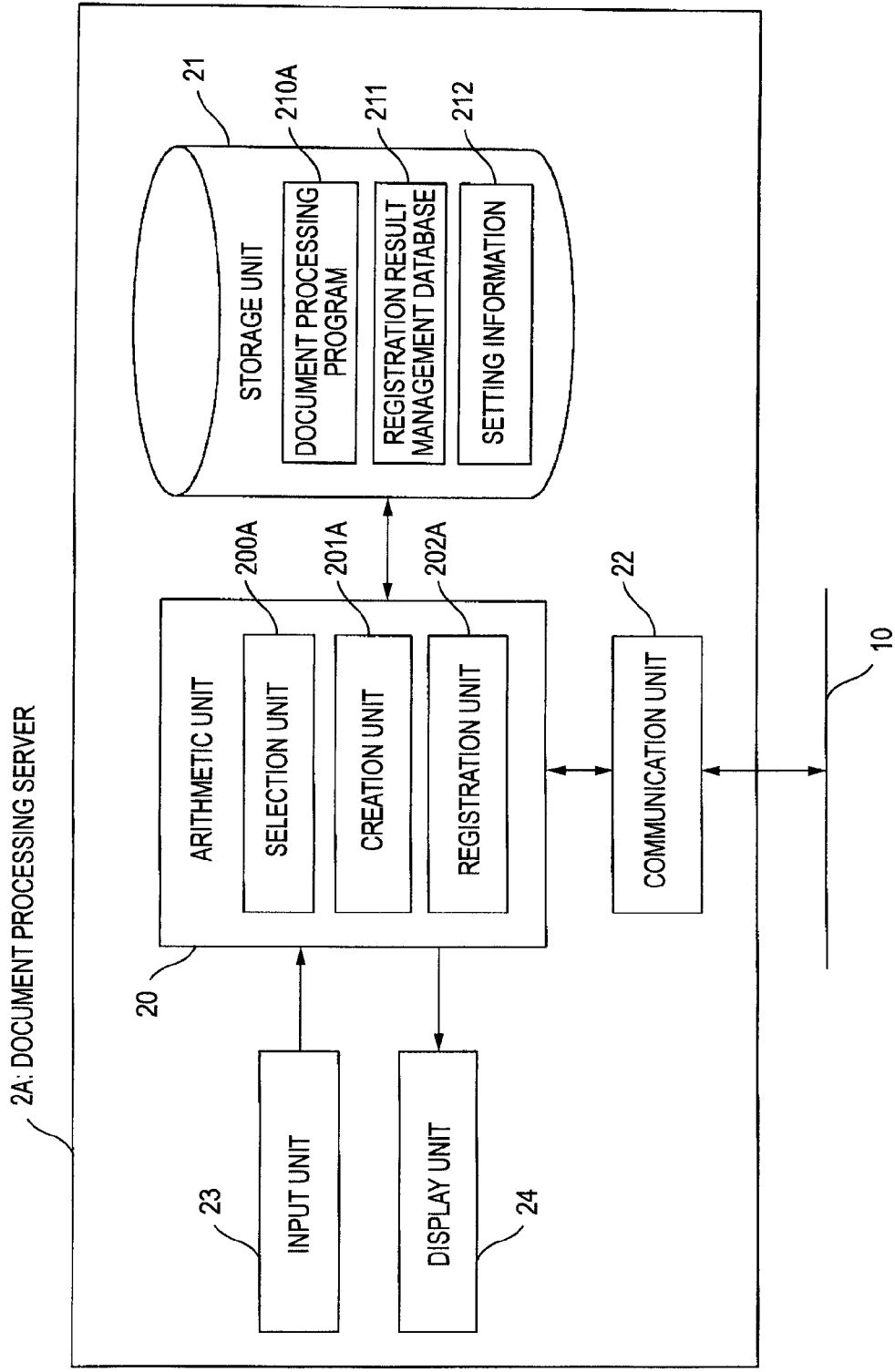

FIG. 3A

| STORAGE LOCATION ID | STORAGE LOCATION |
|---|---|
| F1 | LATEST PC INFORMATION |
| F2 | ESTIMATION REQUEST |
| F3 | ESTIMATION SHEET |
| ... | ... |

| DOCUMENT ID | TITLE | STORAGE DESTINATION ID | CANDIDATE ID | PAST STORAGE DESTINATION CANDIDATE ID |
|---|---|---|---|---|
| D1 | REQUEST FOR PC PURCHASE | F1 | F2,F3 | |
| D2 | APPLICATION FOR SAVING VACATION | F4 | F5 | |
| ... | ... | ... | ... | |

| DOCUMENT ID | REGISTRATION RESULT SHEET ID | NUMBER OF PAGES | INTRA-PAGE NUMBER |
|---|---|---|---|
| D1 | S1 | 1 | 1 |
| D2 | S2 | 1 | 1 |
| ... | ... | ... | ... |

| REGISTRATION RESULT SHEET ID | CREATION DATE AND TIME |
|---|---|
| S1 | 2007/3/1 10:10 |
| S2 | 2007/3/2 12:12 |
| ... | ... |

| | 212 |
|---|---|
| NUMBER OF STORAGE DESTINATION CANDIDATES | 3 |
| VARIATION IN THRESHOLD VALUE | 10 |
| REGISTRATION RESULT SHEET AVAILABLE PERIOD | A DAY |

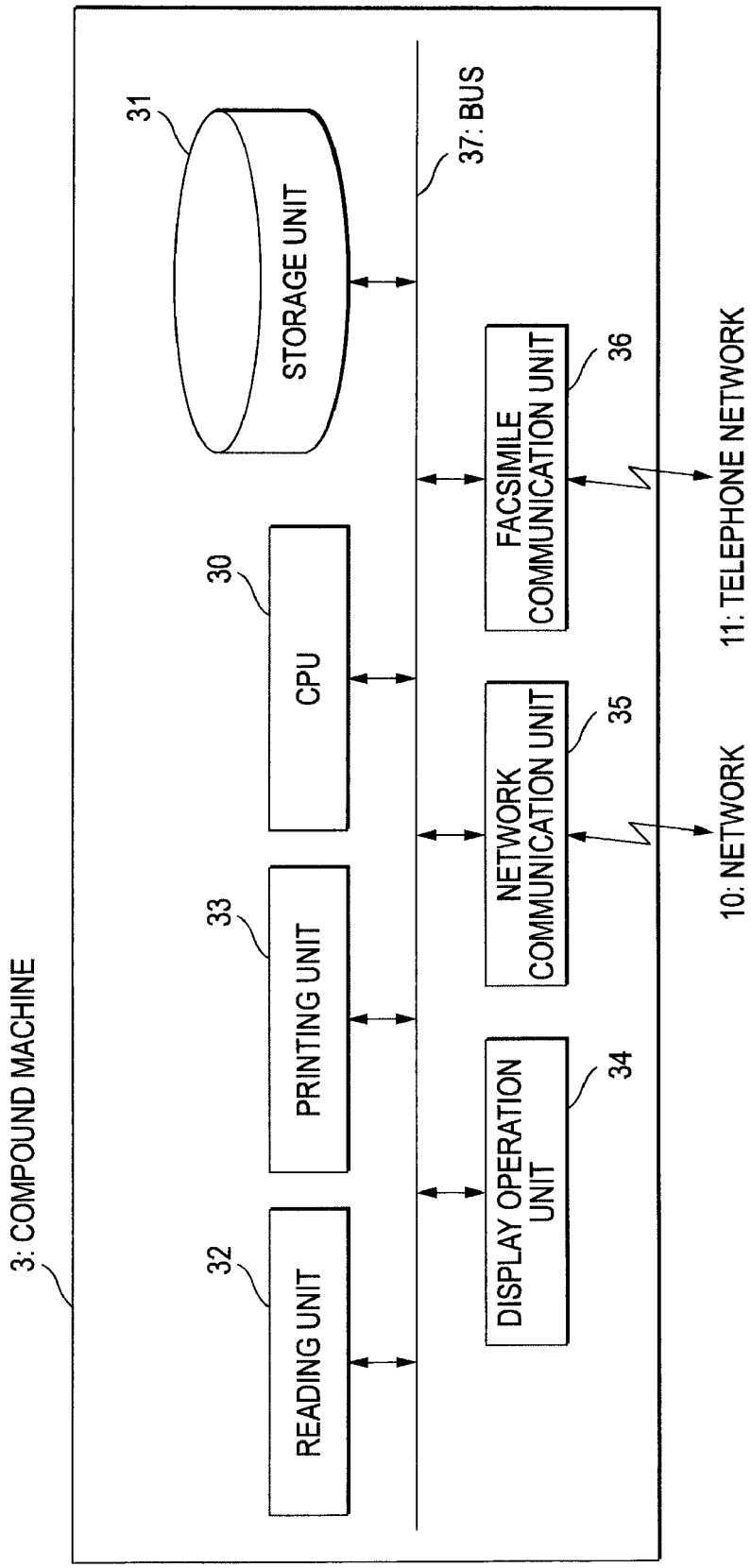

| STORAGE LOCATION ID | STORAGE LOCATION |
|---|---|
| F1 | LATEST PC INFORMATION |
| F2 | ESTIMATION REQUEST |
| F3 | ESTIMATION SHEET |
| F4 | DEVELOPMENT G/APPLICATION |
| F5 | PERSONNEL DEPARTMENT/APPLICATION |
| F6 | PERSONNEL DEPARTMENT/SUPPORT OF DEPENDENTS |
| F7 | PURCHASE REQUEST |
| F8 | REPAIR REQUEST |
| F9 | FIXTURES MANAGEMENT |

| DOCUMENT ID | TITLE | STORAGE DESTINATION ID | CANDIDATE ID | PAST STORAGE DESTINATION CANDIDATE ID |
|---|---|---|---|---|
| D1 | REQUEST FOR PC PURCHASE | F1 | F2,F3 | |
| D2 | APPLICATION FOR SAVING VACATION | F4 | F5 | |
| D3 | APPLICATION FOR SUPPORT OF DEPENDENTS | F6 | | |

| DOCUMENT ID | REGISTRATION RESULT SHEET ID | NUMBER OF PAGES | INTRA-PAGE NUMBER |
|---|---|---|---|
| D1 | S1 | 1 | 1 |
| D2 | S1 | 1 | 2 |
| D3 | S1 | 1 | 3 |

| REGISTRATION RESULT SHEET ID | CREATION DATE AND TIME |
|---|---|
| S1 | 2007/3/1 10:10 |

| STORAGE LOCATION ID | STORAGE LOCATION |
|---|---|
| F1 | LATEST PC INFORMATION |
| F2 | ESTIMATION REQUEST |
| F3 | ESTIMATION SHEET |
| F4 | DEVELOPMENT G/APPLICATION |
| F5 | PERSONNEL DEPARTMENT/APPLICATION |
| F6 | PERSONNEL DEPARTMENT/SUPPORT OF DEPENDENTS |
| F7 | PURCHASE REQUEST |
| F8 | REPAIR REQUEST |
| F9 | FIXTURES MANAGEMENT |

| DOCUMENT ID | TITLE | STORAGE DESTINATION ID | CANDIDATE ID | PAST STORAGE DESTINATION CANDIDATE ID |
|---|---|---|---|---|
| D1 | REQUEST FOR PC PURCHASE | F7 | F8, F9 | F1, F2, F3 |
| D2 | APPLICATION FOR SAVING VACATION | F5 | | |
| D3 | APPLICATION FOR SUPPORT OF DEPENDENTS | F6 | | |

| DOCUMENT ID | REGISTRATION RESULT SHEET ID | NUMBER OF PAGES | INTRA-PAGE NUMBER |
|---|---|---|---|
| D1 | S2 | 1 | 1 |
| D2 | S2 | 1 | 2 |

| REGISTRATION RESULT SHEET ID | CREATION DATE AND TIME |
|---|---|
| S1 | 2007/3/1 10:10 |
| S2 | 2007/3/2 9:00 |

US 8,010,583 B2

COMPUTER READABLE MEDIUM, DOCUMENT PROCESSING APPARATUS, AND DOCUMENT PROCESSING SYSTEM WITH SELECTIVE STORAGE

CROSS-REFERENCE TO RELATED APPLICATIONS

This application is based on and claims priority under 35 U.S.C. 119 from Japanese Patent Application No. 2007-220202 filed Aug. 27, 2007.

BACKGROUND

Technical Field

The present invention relates to a computer readable medium, a document processing apparatus, and a document processing system.

SUMMARY

According to an aspect of the present invention, a computer readable medium storing a program causing a computer to execute a process for performing an image processing, the process including: selecting a first storage location as a storage destination of an electronic document based on image information of the electronic document generated by reading a document to be stored; selecting a second storage location as a storage destination candidate of the electronic document; registering the electronic document to the first storage location; creating result information including information on the electronic document, the first storage location and the second storage location; allowing a user to instruct changing the storage destination of the electronic document from the first storage location to the second storage location; and registering the electronic document to the second storage location on the basis of the instruction.

BRIEF DESCRIPTION OF THE DRAWINGS

Exemplary embodiment of the present invention will be described in detail based on the following figures, wherein:

FIG. 2 is a block diagram showing an example of the schematic configuration of a document processing server according to the first embodiment of the invention;

FIGS. 3A to 3D are diagrams showing an example of a registration result management database according to the first embodiment of the invention;

FIG. 4 is a diagram showing an example of setting information according to the first embodiment of the invention;

FIG. 5 is a block diagram showing an example of the schematic configuration of a compound machine according to the first embodiment of the invention;

FIGS. 6A to 6D are diagrams showing an example of a registration result management database when an electronic document is read;

FIGS. 9A to 9D are diagrams showing an example of a registration result management database when a registration result sheet is read;

DETAILED DESCRIPTION

First Embodiment

Figure 1:
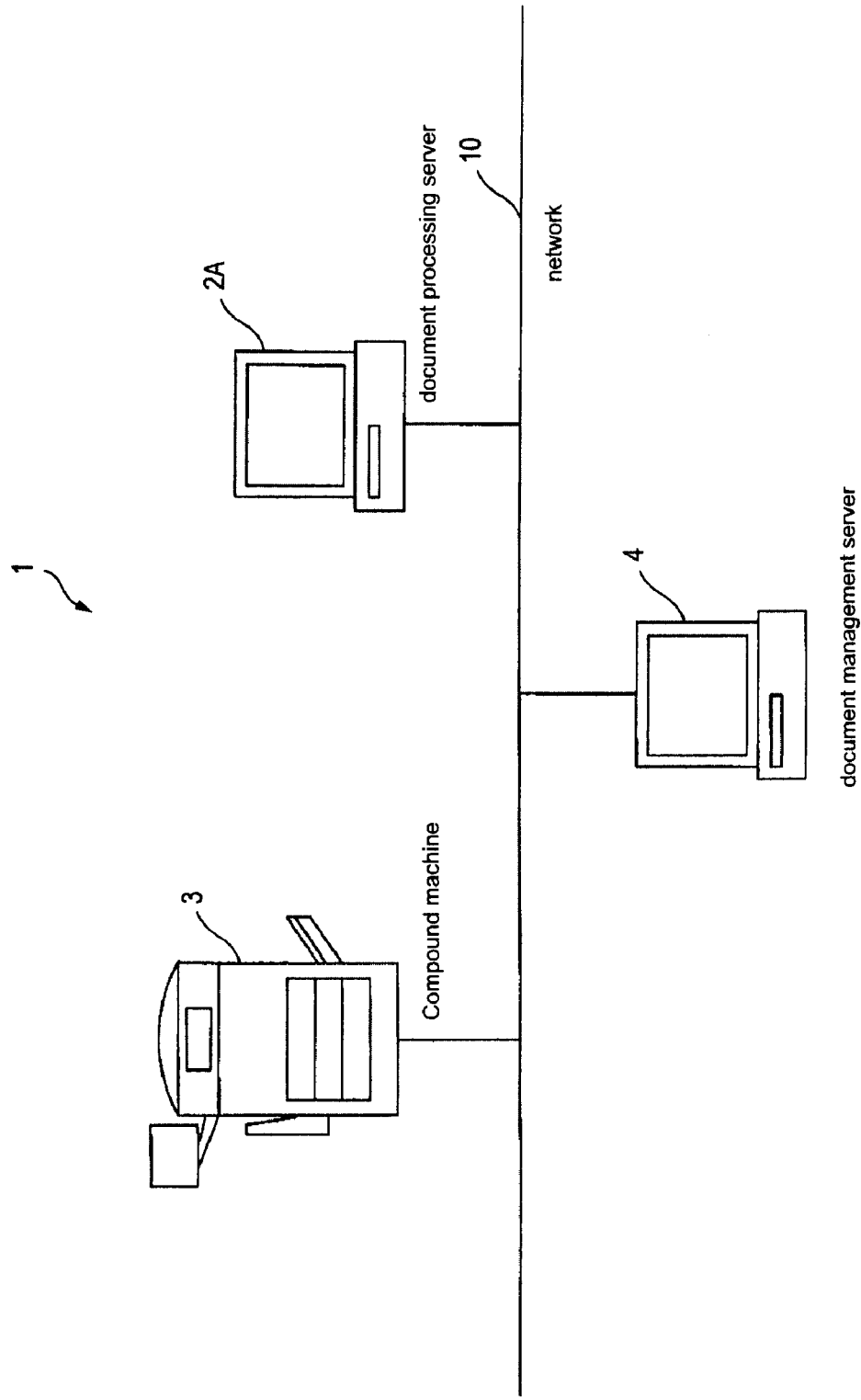
FIG. 1 is an overall view showing an example of the schematic configuration of a document processing system according to a first embodiment of the invention.

FIG. 1 is an overall view showing an example of the schematic configuration of a document processing system according to a first embodiment of the invention.

A document processing system 1 includes a scanner that optically reads a document to be registered as an electronic document or a compound machine 3 that has a plurality of functions, such as a printer that prints the electronic document, a document processing server 2A that selects a storage destination corresponding to a form of the electronic document and candidates therefor on the basis of image information of the electronic document transmitted from the compound machine 3, a document management server 4 that sorts and stores the electronic document to the storage destination of the electronic document, and a network 10 that connects the compound machine 3, the document processing server 2A, and the document management server 4 with each other.

Although the single compound machine 3 and the single document management server 4 are shown in FIG. 1, two or more compound machines or document management servers may be provided. In addition, instead of the compound machine 3, an apparatus having a single function, such as a scanner or a printer, may be systematically provided.

The network 10 is a local area network, such as a wired LAN or a wireless LAN. Alternatively, the network 10 may be a network that is connected to Internet. In addition, instead of the network 10, for example, a communication unit, such as a leased line, other than the network, may be used.

Here, the contents of the 'document' is not particularly limited, but it may be numerals, symbols, character strings, photographs, illustrations, figures, and a combination thereof. The document includes, for example, the contents that are described on the basis of various forms, such as contracts, specifications, applications, and reports. The document may be stored as digital data, which is referred to as an electronic document.

The term 'storage destination' or 'candidate' means the position of a storage location that is provided in a storage unit of the document management server 4 and to which an electronic document is registered. In an example of the embodiment of the invention, a folder is used as the storage location to which the electronic document is registered. Moreover, the position of the folder may be represented by an absolute path or a relative path. Furthermore, the electronic document may be stored in a single folder that is represented by a single storage destination or a plurality of folders that are represented by a plurality of storage destinations.

(Document Processing Server)

FIG. 2 is a block diagram showing an example of the schematic configuration of the document processing server 2A. The document processing server 2A includes an arithmetic unit 20 that controls the individual units of the document processing server 2A and is implemented with, for example, a CPU, a storage unit 21 that stores a document processing program 210A or various kinds of data and is implemented with, for example, a ROM, a RAM, or an HDD, a communication unit 22 that is connected to the network 10 to perform data transmission/reception and is implemented with, for example, a network interface card, an input unit 23 that receives data input or an operation instruction and is implemented with, for example, a keyboard or a mouse, and a display unit 24 that displays a processing result of the arithmetic unit 20 and is implemented with, for example, an LCD (Liquid Crystal Display).

The document processing server 2A may be constructed by, for example, a computer or a workstation (WS).

The arithmetic unit 20 operates according to the document processing program 210A stored in the storage unit 21 and functions as a selection unit 200A, a creation unit 201A, and a registration unit 202A.

The selection unit 200A estimates a form of an electronic document on the basis of image information of the electronic document received by the communication unit 22 through the network 10, selects a storage location corresponding to the estimated form as a storage destination of the electronic document, and selects one or more storage locations corresponding to other forms as candidates (storage destination candidates) of the electronic document. Then, the selection unit 200A stores the selected storage destination and candidates in the storage unit 21 as registration result information.

For example, the selection unit 200A analyzes a character string, such as the document title described in the document, or a layout of a character string or an image in the document by an image processing, and acquires a characteristic amount of the electronic document. Next, the selection unit 200A prepares a correspondence table between a plurality of storage locations and characteristic amounts allocated to the storage locations in advance, and compares the characteristic amount acquired from the electronic document with the characteristic amount allocated to each storage location in the correspondence table. Then, the selection unit 200A selects, as the storage destination of the electronic document, a storage location, which has a smallest difference in the characteristic amount, among storage locations, each of which has a difference in the characteristic amount equal to or less than a predetermined threshold value, and selects other storage locations as the candidates.

As an alternative method that selects the storage destination and the candidates, the selection unit 200A prepares a correspondence table between a plurality of storage locations and keywords associated with the storage locations in advance, analyzes a character string in the document by a character recognition processing, and counts the number of appearances of each keyword in the character string. Then, the selection unit 200A selects a storage location corresponding to a keyword having the largest number of appearances as a storage destination, and selects other storage locations as the candidates.

When an instruction is input from the registration unit 202A to select the candidates among storage locations other than the previously selected storage destination and candidates, the selection unit 200A selects storage locations, excluding the previously selected storage destination and candidates, as new candidates.

The creation unit 201A creates the registration result information including information on an electronic document to be registered and identification information of the storage destination and candidates selected by the selection unit 200A. Then, the creation unit 201A transmits print information such that the compound machine 3 prints the created registration result information as a registration result sheet (a printed matter of the registration result).

The information on the electronic document is information that allows a user to specify the electronic document, and includes, for example, the title of the electronic document, a reduced image of a predetermined page in the electronic document, and the like. The identification information of the storage destination and candidates is information that allows the user to identify the storage locations, which are selected as the storage destination and candidates. The identification information includes, for example, the name of the folder representing the storage location, the position of the folder, and the like.

In addition, when the selection unit 200A selects the new candidates, the creation unit 201A creates the registration result information including the information of the electronic document and identification information of the new candidates selected by the selection unit 200A. Here, the registration result information may include or not include identification information of the previously selected storage destination.

The registration unit 202A registers the electronic document to the storage destination selected by the selection unit 200A, and after the registration is performed, on the basis of result information that instructs to change one of the candidates selected by the selection unit 200A to the storage destination, registers the electronic document to the instructed candidate. For example, in regards to the registration result sheet printed by the compound machine 3, when change instruction information that instructs to change one of the selected candidates to the storage destination is acquired from the image information that is read by the compound machine 3, the registration unit 202A registers the electronic document to the candidate instructed by the change instruction information.

In addition, when the change instruction information that instructs to change the storage destination of the electronic document in connection with the registration result information is not received within a predetermined period, the registration unit 202A deletes the registration result information from the storage unit 21.

The storage unit 21 stores a registration result management database 211 and setting information 212, in addition to the document processing program 210A.

FIGS. 3A to 3D are diagrams showing an example of the registration result management database 211. The registration result management database 211 stores the storage destination of the electronic document and the candidates selected by the selection unit 200A, and associates the storage destination and the candidates with tables 211a to 211d shown in FIGS. 3A and 3D.

A storage location table 211a shown in FIG. 3A stores a registrable storage location of an electronic document as an attribute, with a storage location ID for identifying a storage location as a key.

A registration result management table 211b shown in FIG. 3B stores, as attributes, the title of an electronic document, a storage destination ID and candidate IDs representing the storage destination and the candidates selected by the selection unit 200A, and past storage destination candidate IDs representing past storage destination and candidates selected by the selection unit 200A in the past, with a document ID for identifying an electronic document as a key. The storage location IDs are input in the storage destination ID, the candidate ID, and the past storage destination candidate ID. With reference to the storage location table 211a, the storage locations corresponding to the storage location IDs are specified.

A registration result sheet table 211c shown in FIG. 3C stores, as attributes, a registration result sheet ID for identifying a registration result sheet created by the creation unit 201A, the number of pages of the registration result sheet, and an intra-page number, which is sequentially numbered in the same page of the registration result sheet, with a document ID as a key.

A registration result sheet creation date-and-time table 211d shown in FIG. 3C stores, as creation date and time, date and time at which the print information transmitted to the compound machine 3 is created by the creation unit 201A, with a registration result sheet ID as a key.

FIG. 4 is a diagram showing an example of the setting information 212. The setting information 212 stores the number of storage destination candidates, a variation in threshold value, and a registration result sheet available period as parameters, which define the operation conditions of the document processing program 210A. Moreover, the setting information 212 may be stored for every user or group.

The number of storage destination candidates is a parameter that is referred to by the selection unit 200A. The number of storage destination candidates is the number of storage locations that are selected as the storage destination and the candidates when the selection unit 200A selects the storage destination and the candidates. For example, when the number of storage destination candidates is '3', the selection unit 200A selects one storage destination and two candidates.

The variation in threshold value is a parameter that is referred to by the selection unit 200A. The variation in threshold value is used when the selection unit 200A repeatedly selects the storage destination and the candidates. That is, the selection unit 200A repeatedly selects the storage destination and the candidates in a state where a predetermined threshold value is changed by the variation in threshold value.

The registration result sheet available period is a parameter that represents a period in the registration result sheet. When the registration unit 202A does not receive the change instruction information to change the storage destination of the electronic document until the registration result sheet available period elapses after the date and time stored in the registration result sheet creation date-and-time table 211d, the registration result information is deleted from the registration result sheet table 211c.

(Compound Machine)

FIG. 5 is a block diagram showing an example of the schematic configuration of the compound machine 3. The compound machine 3 includes a CPU 30 that controls the individual units of the compound machine 3, a storage unit 31 that stores programs, such as a control program 310, and data, and is implemented with a ROM, a RAM, or an HDD, a reading unit 32 that reads a document to be registered or a registration result sheet as image information, an electrophotographic type or ink jet type printing unit 33 that outputs the registration result sheet on the basis of the print information created by the document processing server 2A, a touch panel display that is formed by piling up a touch panel on a surface of a display or a display operation unit 34 that includes a hardkey, such as a start key, a network communication unit 35 that is connected to the network 10, and is implemented with a network interface card, and a facsimile communication unit 36 that is connected to a telephone network 11. All of them are connected with each other through a bus 37.

The reading unit 32 includes an original placing stand, on which an original is placed (that is, set) on sheet by sheet, an ADF (Auto Document Feeder) that automatically feeds one or more originals to the original placing stand sheet by sheet, and a photoelectric conversion element that optically reads image information from the original placed on the original placing stand or the original fed from the ADF.

(Document Management Server)

The document management server 4 includes an arithmetic unit that controls the individual units of the document management server 4 and is implemented with, for example, a CPU, a communication unit that is connected to the network 10 and implemented with, for example, a network interface card, and a storage unit that stores an electronic document received through the communication unit in a folder as a storage location, and is implemented with a ROM, a RAM, or an HDD.

Operation of First Embodiment

Next, an example of the operation of the document processing system 1 according to the first embodiment of the invention will be described with reference to FIGS. 6A to 11. Here, a case where a user sequentially reads three documents, for example, a request for PC purchase, an application for saving vacation, and an application for support of dependents, by the compound machine 3, and registers the electronic documents in the document management server 4 will be described with reference to a flowchart of FIG. 11. Moreover, the request for PC purchase, the application for saving vacation, and the application for support of dependents may be collectively read as a bundle.

(1) Storage Destination Selection

First, if the user sets the request for PC purchase as an original to be scanned on the original placing stand or the ADF of the compound machine 3, a confirmation message about whether to perform new electronic document registration is displayed on the display operation unit 34 (Step S101).

Next, the user inputs a purport to perform new registration on the display operation unit 34 in response to the confirmation message (Step S101: Yes), and performs a scan instruction about the size of the original and resolution during scanning.

Next, when the scan instruction input by the display operation unit 34 is received, the CPU 30 of the compound machine 3 performs a scan processing to read the request for PC purchase set on the original placing stand by the photoelectric conversion element of the reading unit 32. Then, the CPU 30 transmits the read electronic document to the document processing server 2A by the network communication unit 35 through the network 10.

Next, when the electronic document transmitted from the compound machine 3 is received through the communication unit 22, the arithmetic unit 20 of the document processing server 2A transmits the received electronic document to the selection unit 200A.

Next, the selection unit 200A selects the storage destination and the candidates, which are used to register the electronic document in the document management server 4 on the basis of the image information of the electronic document received from the arithmetic unit 20 (Step S102).

Specifically, the selection unit 200A analyzes a character string representing a title in the request for PC purchase or a layout of a character string or an image in the request for PC purchase by an image processing, and acquires the characteristic amount of the electronic document. Next, with reference to the correspondence table between the plurality of storage locations in the storage location table 211a shown in FIG. 6A and the characteristic amounts correspondingly allocated to the storage locations, the selection unit 200A compares the characteristic amount acquired from the electronic document with the characteristic amount allocated to each storage location in the correspondence table. Then, it is assumed that the selection unit 200A selects 'LATEST PC INFORMATION', which is a storage location having a smallest difference in the characteristic amount, among storage locations, each of which has a difference in the characteristic amount equal to or less than a predetermined threshold value, and selects 'ESTIMATION REQUEST' and 'ESTIMATION SHEET' as the candidates.

Next, the selection unit 200A notifies the selected storage destination of the registration unit 202A. Then, the registration unit 202A that receives the notification registers the electronic document in the storage unit of the document management server 4 corresponding to 'LATEST PC INFORMATION' as the storage destination through the communication unit 22 (Step S103).

Next, the selection unit 200A adds the selected storage destination and candidates to the registration result management database 211 (Step S104).

That is, as shown in the first row of the registration result management table 211b of FIG. 6B, the selection unit 200A adds, as a record corresponding to the request for PC purchase, a record, in which 'REQUEST FOR PC PURCHASE' is input in a title column, a storage location ID 'F1' representing 'LATEST PC INFORMATION' is input in a storage destination ID column, and storage location IDs 'F2' and 'F3' representing 'ESTIMATION REQUEST' and 'ESTIMATION SHEET', respectively, are input in a candidate ID column.

In addition, the selection unit 200A newly issues a registration result sheet ID for identifying a registration result sheet, and as shown in the first row of the registration result sheet table 211c of FIG. 6C, adds a record, in which a newly issued registration result sheet ID 'S1' is input in a registration result sheet ID column, '1' is input in a number-of-pages column, and '1' is input in an intra-page number column.

Next, if the user performs a scan instruction for new registration of the application for saving vacation and the application for support of dependents in the same manner as described above (Step S101: Yes), the CPU 30 of the compound machine 3 performs a scan processing of the application for saving vacation and the application for support of dependents, and transmits the electronic documents thereof to the document processing server 2A by the network communication unit 35.

Next, if the arithmetic unit 20 of the document processing server 2A receives the electronic documents through the communication unit 22, the selection unit 200A selects the storage destinations and the candidates for the electronic documents (Step S102).

Here, it is assumed that the selection unit 200A selects 'DEVELOPMENT G/APPLICATION' as the storage destination of the application for saving vacation, and selects 'PERSONNEL DEPARTMENT/APPLICATION' as the candidate. In addition, it is assume that the selection unit 200A selects 'ESTIMATION SHEET' as the storage destination of the application for support of dependents, but it does not select other storage locations as the candidates.

Next, the registration unit 202A registers the electronic documents of the application for saving vacation and the application for support of dependents to the storage destinations selected by the selection unit 200A (Step S103). Then, the selection unit 200A adds the storage destinations and the candidates of the electronic documents to the registration result management database 211 (Step S104).

That is, the selection unit 200A adds, as a record corresponding to the application for saving vacation, a record, in which 'APPLICATION FOR SAVING VACATION' is input in the title column, 'F4' is input in the storage destination ID, and 'F5' is input in the candidate ID, to the second row of the registration result management table 211b of FIG. 6b. In addition, the selection unit 200A adds, as a record corresponding to the application for support of dependents, a record, in which 'APPLICATION FOR SUPPORT OF DEPENDENTS' is input in the title column, 'F6' is input in the storage destination ID column, and a blank is input in the candidate ID, to the third row of the registration result management table 211b.

Furthermore, the selection unit 200A adds, as a record corresponding to the application for saving vacation, a record, in which a registration result sheet ID 'S1' is input in the registration result sheet ID column, '1' is input in the number-of-pages column, and '2' is input in the intra-page number column, to the second row of the registration result sheet table 211c of FIG. 6C. In addition, the selection unit 200A adds, as a record corresponding to the application for support of dependents, a record, in which a registration result sheet ID 'S1' is input in the registration result sheet ID column, '1' is input in the number-of-pages column, and '3' is input in the intra-page number column, to the third row of the registration result sheet table 211c.

(2) Registration Result Sheet Printing and Filling

Next, if the user instructs to print the registration result sheet by the display operation unit 34 of the compound machine 3, the CPU 30 of the compound machine 3 transmits the print instruction to the document processing server 2A by the network communication unit 35 through the network 10. Moreover, the registration result sheet may be printed by a print instruction from the input unit 23 of the document processing server 2A or when the document processing server 2A detects that a predetermined period, for example, a day or a week elapses. However, this is not intended to limit the invention.

Next, when receiving the print instruction by the communication unit 22, the arithmetic unit 20 of the document processing server 2A transmits, to the creation unit 201A, a print instruction notification indicating that the print instruction is received.

Next, when receiving the print instruction notification, the creation unit 201A acquires registration result information corresponding to the registration result sheet ID 'S1', which is not printed as a registration result sheet yet, from the registration result information stored in the registration result management database 211, and on the basis of the acquired registration result information, creates print information, which is to be printed on a paper as the registration result sheet. Then, the creation unit 201A transmits the created print information to the compound machine 3 by the communication unit 22 through the network 10.

Furthermore, the creation unit 201A adds date and time, at which the print information of the registration result sheet ID 'S1' is created, to a record in the first row of the registration result sheet creation date-and-time table 211*d* shown in FIG. 6D.

Next, when receiving the print information transmitted from the creation unit 201A by the network communication unit 35, the CPU 30 of the compound machine 3 prints the registration result sheet by the printing unit 33 on the basis of the received print information (Step S105).

Figure 7:
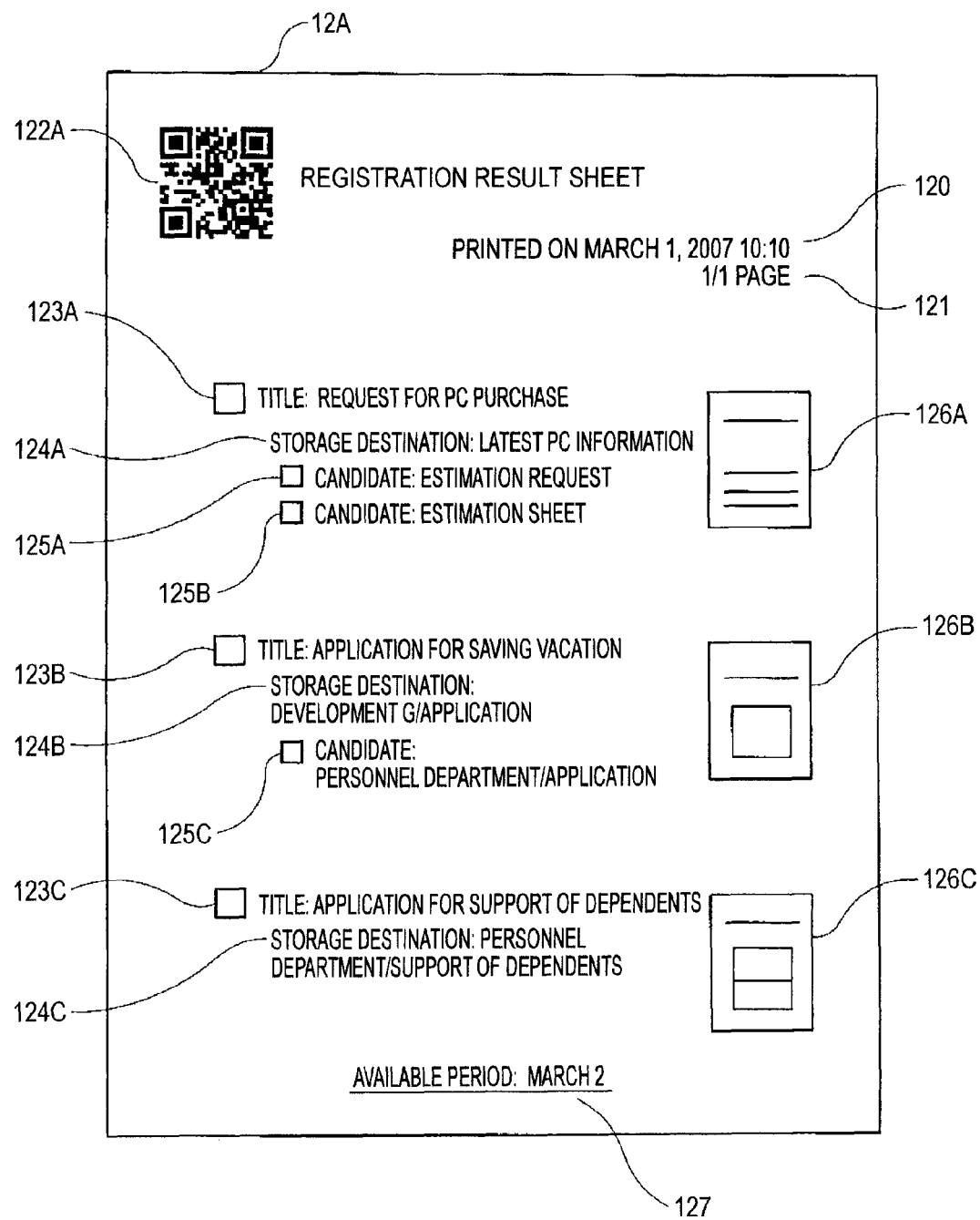
FIG. 7 is a diagram showing an example of a registration result sheet.

FIG. 7 is a diagram showing an example of a registration result sheet that is printed by the printing unit 33. In an upper portion of a registration result sheet 12A, print date and time 120 representing date and time at which the registration result sheet 12A is printed, the number of pages 121 representing the number of pages of the registration result sheet 12A, and a QR code (Registered Trademark) 122A described below are printed. In a central portion thereof, the registration result information stored in the registration result management database 211 in connection with the three electronic documents of the request for PC purchase, the application for saving vacation, and the application for support of dependents is printed. In addition, in a lower portion thereof, an available period 127 representing a period, in which the user has to process the registration result sheet 12A, is printed.

In the QR code 122A that is printed in the upper portion, the registration result sheet ID representing the registration result sheet 12A, the number of pages of the registration result sheet 12A, and the registration result sheet available period of the registration result sheet 12A are recorded as registration result sheet information. Moreover, instead of the QR code 122A, other two-dimensional codes, such as PDF417, Data Matrix, and Maxi Code, a one-dimensional code, such as a barcode, or a unique code may be used. In addition, various kinds of codes may be used in combination according to the purposes.

In the central portion of the registration result sheet 12A, the titles, the storage destinations 124A to 124C, and the candidates of the request for PC purchase, the application for saving vacation, and the application for support of dependents stored in the registration result management table 211*b* are printed per document. In addition, reselection check boxes 123A to 123C arranged on the left sides of the individual titles, candidate check boxes 125A to 125C arranged on the left sides of the individual candidates, and reduced images 126A to 126C, which show image information of, for example, first pages of the individual documents on reduced scales, are printed.

Next, the user views the printed registration result sheet 12A and confirms the storage destinations 124A to 124C to which the electronic documents are registered, respectively. Then, after the user confirms the registration result sheet 12A, when he/she wants to change the storage destination of the electronic document to the candidate, or when he/she wants to reselect the storage destination of the electronic document because no correct storage location exists among the storage destination and the candidates of the electronic document, he/she puts a mark at a predetermined position on the registration result sheet 12A by a pen.

Figure 8:
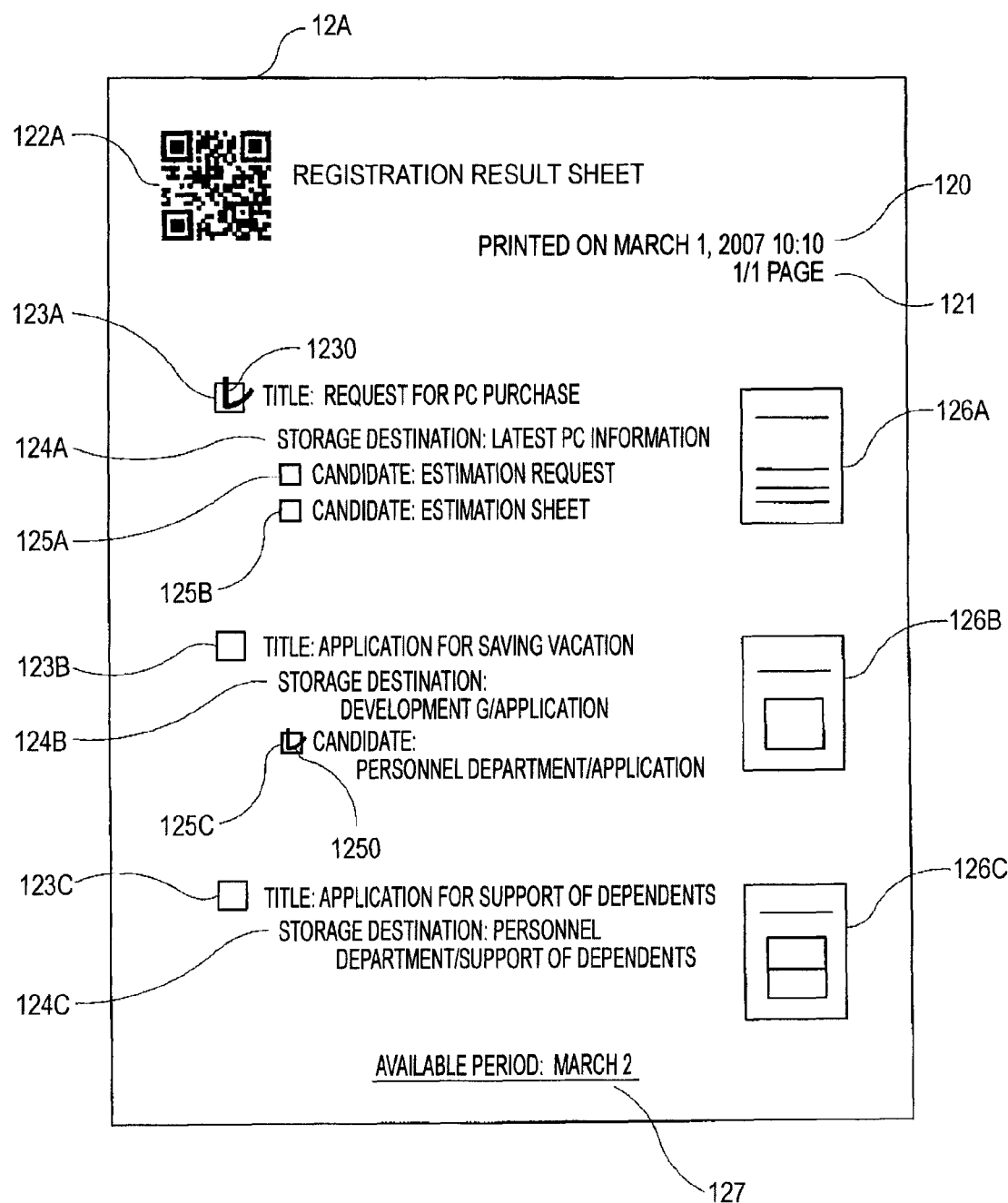
FIG. 8 is a diagram showing an example where a mark is put in a registration result sheet.

FIG. 8 is a diagram showing an example of a registration result sheet on which the user puts a mark. When the user wants to register the request for PC purchase to a storage location other than 'LATEST PC INFORMATION' printed as the storage destination and 'ESTIMATION REQUEST' and 'ESTIMATION SHEET' printed as the candidates, he/she fills a reselection instruction marking 1230, for example, 'v' in the reselection check box 123A. Moreover the mark may, not limited to, have a circular shape or be blackened.

Moreover, in the registration result sheet 12A, instead of providing a check box in which the user's instruction is filled, when a mark is put to surround a character string of a title or a candidate, it may be considered that the user inputs an instruction. In addition, when the character string is underlined or when a mark is put over the character string, it may be considered that the user inputs an instruction.

When the user wants to register the application for saving vacation to 'PERSONNEL DEPARTMENT/APPLICATION' printed as the candidate, not 'DEVELOPMENT G/APPLICATION' printed as the storage destination, he/she puts a change instruction marking 1250, which instructs to register the electronic document to 'PERSONNEL DEPARTMENT/APPLICATION', in the candidate check box 125C.

When the user determines that the application for support of dependents is preferably registered to 'PERSONNEL DEPARTMENT/SUPPORT OF DEPENDENTS' printed in the registration result sheet 12A, he/she does not put a mark in the reselection check box 123C.

(3) Registration Result Sheet Content Reflection

Next, the user sets the registration result sheet 12A, in which a mark is put, on the original placing stand of the compound machine 3, inputs a purport not to perform new registration in response to the confirmation message about whether or not to perform new registration, which is displayed on the display operation unit 34, and performs a scan instruction of the registration result sheet 12A (Step S101: No).

Next, when receiving the scan instruction input by the display operation unit 34, the CPU 30 of the compound machine 3 reads the registration result sheet 12A set on the original placing stand by the photoelectric conversion elements of the reading unit 32. Then, the CPU 30 of the compound machine 3 transmits the read image information of the registration result sheet 12A to the document processing server 2A by the network communication unit 35 through the network 10.

Next, when receiving the image information transmitted from the compound machine 3 by the communication unit 22, the arithmetic unit 20 of the document processing server 2A performs an analysis processing on the image information (Step S111). That is, the arithmetic unit 20 extracts the QR code 122A from the image information, and acquires the registration result sheet information that is recorded in the QR code 122A. In addition, the arithmetic unit 20 acquires reselection instruction information representing presence/absence of the reselection instruction marking 1230 for the reselection check boxes 123A to 123C, and also acquires change instruction information representing presence/absence of a change instruction marking 1250 for the candidate check boxes 125A to 125C. Then, the arithmetic unit 20 transmits, to the registration unit 202A, the acquired registration result sheet information, the reselection instruction information, and the change instruction information.

Moreover, instead of an input operation from the user about whether or not to perform new registration at Step S101, the arithmetic unit 20 extracts the QR code 122A from the image information, and when the registration result sheet information is acquired, determines not to perform new registration. Meanwhile, when the registration result sheet information is not acquired, the arithmetic unit 20 may determine to perform new registration.

Next, if the information is received, the registration unit 202A confirms whether or not the registration result sheet ID in the received registration result sheet information exists in the registration result sheet creation date-and-time table 211$d$ of the registration result management database 211 (Step S112). In addition, the registration unit 202A acquires the creation date and time corresponding to the registration result sheet ID from the registration result sheet creation date-and-time table 211$d$, compares the creation date and time with current date and time, and confirms whether or not the period passes the registration result sheet available period in the registration result sheet information.

Then, when the registration unit 202A determines that the registration result sheet ID does not exist in the registration result sheet creation date-and-time table 211$d$ or the registration result sheet available period has expired (Step S112: No), a record of the registration result management table 211$b$ corresponding to that registration result sheet ID is deleted, and a purport that an error occurs is transmitted to the compound machine 3. Then, when receiving the purport, the CPU 30 of the compound machine 3 displays an error message on the display operation unit 34 and completes the processing. Moreover, the registration unit 202A may regularly confirm whether or not each record of the registration result management table 211$b$ passes the registration result sheet available period, and may delete the record when it has passed the registration result sheet available period.

At Step S112, when the registration unit 202A determines that the registration result sheet ID exists in the registration result sheet creation date-and-time table 211$d$ and the registration result sheet available period does not expire (Step S112: Yes), the document ID is acquired from the registration result sheet table 211$c$ with the acquired registration result sheet ID as a key, and the storage destination and the candidates are acquired from the registration result management table 211$b$ with the acquired document ID as a key (Step S113).

Next, the registration unit 202A determines whether or not to perform storage destination reselection on each electronic document on the basis of the reselection instruction information acquired at Step S111, that is, presence/absence of the reselection instruction marking 1230 (Step S114).

In the registration result sheet 12A shown in FIG. 8, for the request for PC purchase as the first electronic document, the reselection instruction marking 1230 is put in the reselection check box 123A. Accordingly, the registration unit 202A determines to perform storage destination reselection (Step S114: Yes). Then, the registration unit 202A acquires the electronic document of the request for PC purchase from the storage destination 'LATEST PC INFORMATION', to which the electronic document is previously registered (Step S115), transmits the electronic document to the selection unit 200A, and instructs to reselect the storage destination and the candidates.

Next, when receiving the electronic document and the reselection instruction, the selection unit 200A changes, by a variation in threshold value in the setting information 212, a threshold value when the storage destination is selected (Step S116), and selects the storage destination and the candidates again (Step S117). Here, it is assumed that the selection unit 200A selects 'PURCHASE REQUEST', 'REPAIR REQUEST', and 'FIXTURES MANAGEMENT' as new storage destination candidates, other than 'LATEST PC INFORMATION', 'ESTIMATION REQUEST', and 'ESTIMATION SHEET'.

Next, if the selection unit 200A notifies the arithmetic unit 20 of the selected storage destination and candidates, the arithmetic unit 20 selects the storage destination and candidates, excluding the past storage destination and candidates stored in the registration result management table 211$b$ (Step S118). That is, the arithmetic unit 20 selects 'PURCHASE REQUEST' as the storage destination of the request for PC purchase, and 'REPAIR REQUEST' and 'FIXTURES MANAGEMENT' as the candidates thereof, excluding 'LATEST PC INFORMATION', 'ESTIMATION REQUEST', and 'ESTIMATION SHEET' as the past storage destination and candidates.

Next, the selection unit 200A notifies the registration unit 202A of the reselected storage destination. Then, the registration unit 202A that has received the notification moves the electronic document of the request for PC purchase from 'LATEST PC INFORMATION', to which the electronic document of the request for PC purchase is registered, to the storage unit of the document management server 4 corresponding to the reselected 'PURCHASE REQUEST', and registers the electronic document (Step S119).

Next, the registration unit 202A determines whether or not the processing of the registration result sheet 12A is completed (Step S122). In this case, however, since only the request for PC purchase among the three electronic documents of the request for PC purchase, the application for saving vacation, and the application for support of dependents is processed, the arithmetic unit 20 selects 'No' (Step S122: No), and returns the process to Step S114.

Next, the registration unit 202A determines whether or not to perform reselection of the application for saving vacation as the second electronic document (Step S114). In this case, however, since the reselection instruction marking 1230 is not put in the reselection check box 123B of the registration result sheet 12A shown in FIG. 8, the registration unit 202A determines not to perform storage destination reselection (Step S114: No).

Next, the registration unit 202A determines whether or not to change the storage destination of the electronic document to the candidate on the basis of the change instruction information acquired at Step S111, that is, presence/absence of the change instruction marking 1250 (Step S120).

In the registration result sheet 12A shown in FIG. 8, the change instruction marking 1250 is put in the candidate check box 125C of 'PERSONNEL DEPARTMENT/APPLICATION' for the application for saving vacation. Accordingly, the registration unit 202A moves the electronic document to the candidate 'PERSONNEL DEPARTMENT/APPLICATION' instructed as the storage destination (Step S121).

Next, the registration unit 202A determines whether or not the processing of the registration result sheet 12A is completed (Step S122). In this case, however, since only two of the three electronic documents are processed, the registration unit 202A selects 'No' (Step S122: No), and returns the process to Step S114.

Next, the registration unit 202A determines whether or not to perform reselection of the application for saving vacation as the third electronic document (Step S114). In this case, however, since the reselection instruction marking 1230 is not put in the reselection check box 123C of the registration result sheet 12A shown in FIG. 8, the registration unit 202A determines not to perform storage destination reselection (Step S114: No).

Next, the registration unit 202A determines whether or not to change the storage destination of the electronic document to the candidate (Step S120). In this case, however, since the change instruction marking 1250 is not put in the registration result sheet 12A shown in FIG. 8, the registration unit 202A determines not to change the storage destination to the candidate (Step S120: No).

Then, since the three electronic documents in the registration result sheet 12A are processed, the registration unit 202A determines at Step S122 that the processing of the registration result sheet 12A is completed (Step S122: Yes).

Next, the registration unit 202A reflects the reselection result of the storage destination and the candidate for the request for PC purchase at Steps S117 and S118 in the registration result management table 211b of the registration result management database 211, newly issues a registration result sheet ID 'S2', and adds a new record to the registration result sheet table 211c (Step S123). In addition, after the storage destination of the application for saving vacation is changed at Step S121, the change result is reflected in the registration result management table 211b, and a new record is added to the registration result sheet table 211c.

Then, the registration unit 202A deletes a record of the registration result sheet table 211c in which the registration result sheet ID 'S1' is input (Step S124).

FIGS. 9A to 9D are diagrams showing an example of the registration result management database 211 after Step S124 is performed. That is, in a registration result management table 211b shown in FIG. 9B, a storage location ID 'F7' representing 'PURCHASE REQUEST' is input in the storage destination ID column of the request for PC purchase, and storage location IDs 'F8' and 'F9' representing 'REPAIR REQUEST' and 'FIXTURES MANAGEMENT' are input in the candidate ID column. In addition, storage location IDs 'F1', 'F2', and 'F3' are stored in the past storage destination candidate ID column. Furthermore, in the registration result management table 211b, a storage location ID 'F5' representing 'PERSONNEL DEPARTMENT/APPLICATION' is stored in the storage destination ID column of the application for saving vacation.

In the registration result sheet table 211c shown in FIG. 9C, the record having the registration result sheet ID 'S1' shown in FIG. 6C is deleted, and two records having the registration result sheet ID 'S2' are added.

(4) Registration Result Sheet Reprinting

Next, if the user instructs to print the registration result sheet by the display operation unit 34 of the compound machine 3 again, the CPU 30 of the compound machine 3 transmits a print instruction notification to the document processing server 2A.

Next, when receiving the print instruction notification, the arithmetic unit 20 of the document processing server 2A transmits, to the creation unit 201A, a notification purporting that the print instruction notification is received.

Next, when receiving the notification, the creation unit 201A acquires the registration result information from the registration result management database 211 with the registration result sheet ID 'S2' as a key, and creates the print information on the basis of the acquired registration result information. Then, the creation unit 201A transmits the created print information to the compound machine 3.

In addition, the creation unit 201A adds, to the second record of the registration result sheet creation date-and-time table 211d shown in FIG. 9D, date and time at which the print information of the registration result sheet ID 'S2' is created.

Next, when receiving the print information transmitted from the creation unit 201A, the CPU 30 of the compound machine 3 prints the registration result sheet by the printing unit 33 on the basis of the received print information (Step S105).

Figure 10:
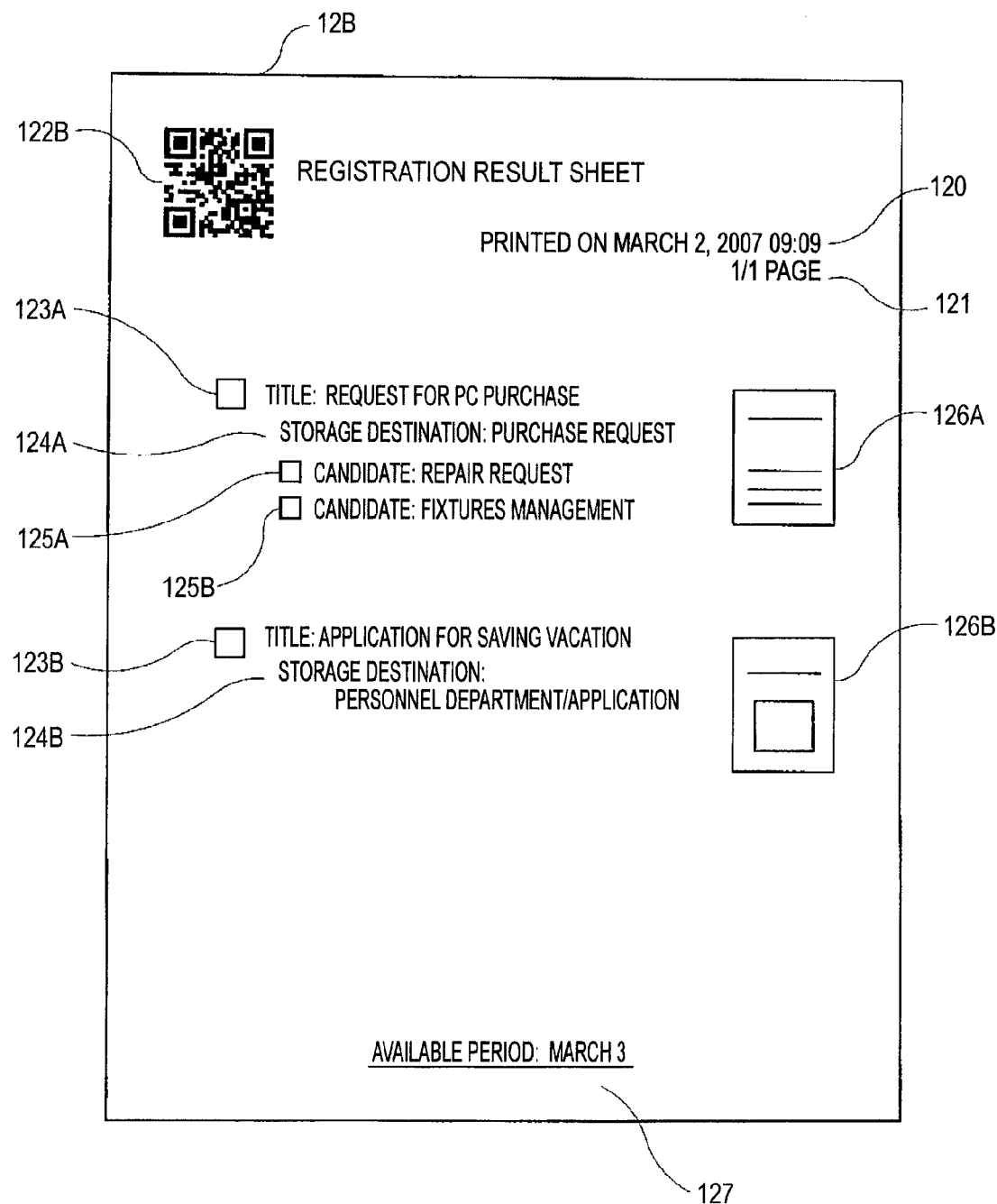
FIG. 10 is a diagram showing a reprinted registration result sheet.
Figure 11:
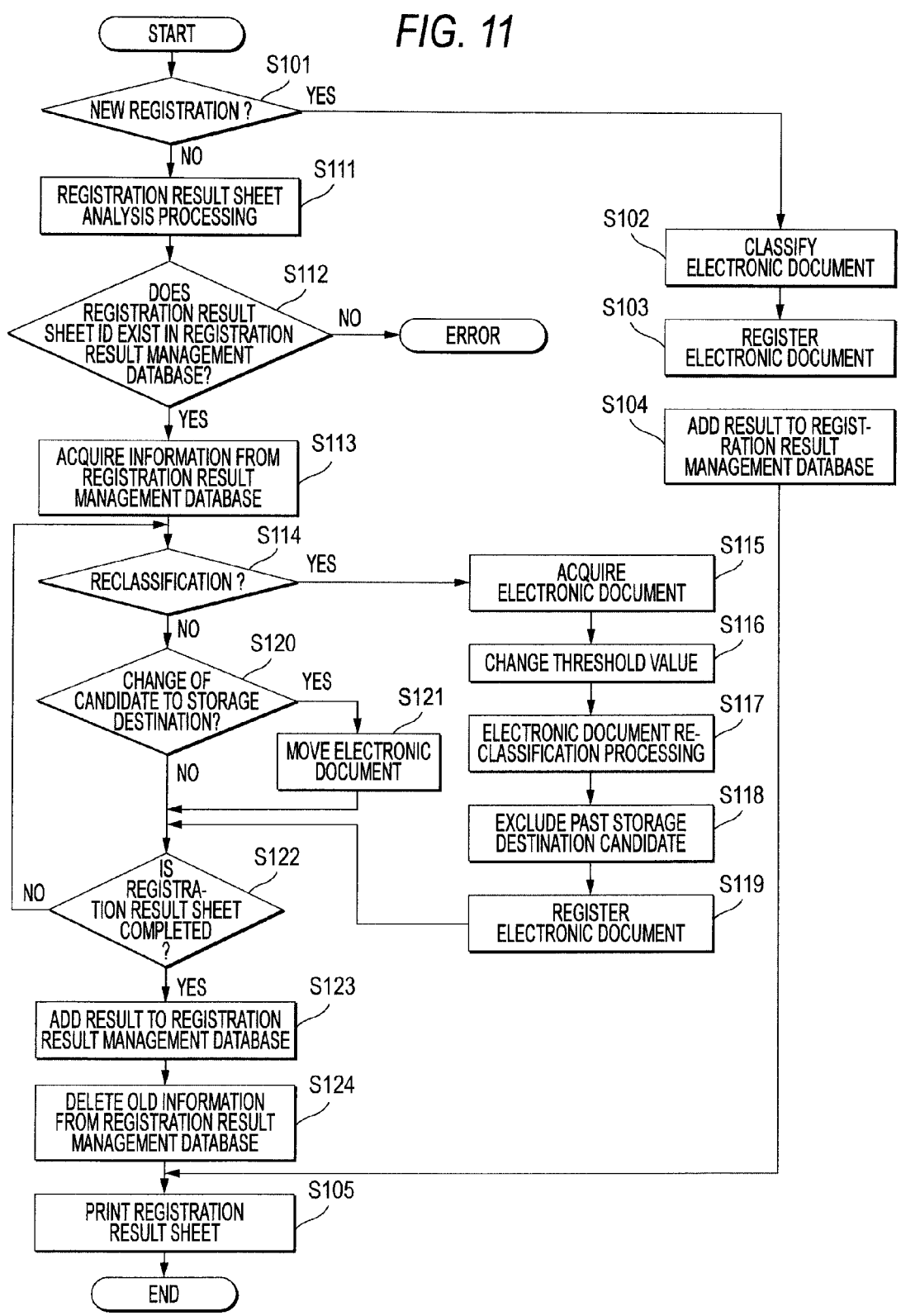
FIG. 11 is a flowchart showing an example of the operation of the document processing system according to the first embodiment of the invention.

FIG. 10 is a diagram showing an example of a registration result sheet that is printed by the printing unit 33. A registration result sheet 12B has the same layout as the registration result sheet 12A shown in FIG. 7. In a QR code 122B that is printed in an upper portion, a registration result sheet ID 'S2' representing the registration result sheet 12B, the number of pages of the registration result sheet 12B, and the registration result sheet available period of the registration result sheet 12B are recorded.

In a central portion of the registration result sheet 12B, the title of the request for PC purchase, which is instructed to be subject to reselection, a reselection check box 123A arranged on the left side of the title, a reselected storage destination 124A, reselected storage destination candidates, candidate check boxes 125A and 125B arranged on the left sides of the individual candidates, and a reduced image 126A, which shows the electronic document of the request for PC purchase on a reduced scale, are printed. Subsequently, the title of the application for saving vacation, for which the candidate is instructed as the storage destination, a storage destination 124B, which is changed from the candidate to the storage destination, and a reduced image 126B, which shows the electronic document of the application for saving vacation on a reduced scale, are printed.

Next, the user views the printed registration result sheet 12B, and confirms the storage destinations 124A and 124B, to which the electronic documents are registered. Then, when the user wants to change the storage destination of the electronic document to the candidate, or when the user wants to reselect the storage destination and the candidates of the electronic document, he/she puts a mark at a predetermined position on the registration result sheet 12B by a pen.

Next, if the user instructs the compound machine 3 to scan the registration result sheet 12B, in which the mark is put, in the same manner as described above, image information of the registration result sheet 12B read by the reading unit 32 of the compound machine 3 is transmitted to the document processing server 2A.

Next, the arithmetic unit 20 of the document processing server 2A performs an image analysis on the received image information of the registration result sheet 12B, and acquires registration result sheet information, reselection instruction information, and change instruction information (Step S111).

Then, when, on the basis of the information acquired from the arithmetic unit 20, determining that the user puts the mark in the registration result sheet 12B, the document processing server 2A reselects the storage destination and the candidates by the selection unit 200A (Step S117), or moves the electronic document by the registration unit 202A (Step S121). In addition, the document processing server 2A adds or deletes the registration result management database (Step S123 or S124), and subsequently prints the registration result sheet again (Step S105).

Meanwhile, when determining that the user does not a mark in any of the electronic documents, which are printed on the registration result sheet 12B (Step S114: No, Step S120: No), the document processing server 2A determines that each electronic document is registered to a desired storage location, and deletes the registration result management database (Step S124). Then, the processing is completed.

(Modification of Registration Result Sheet)

Figure 12:
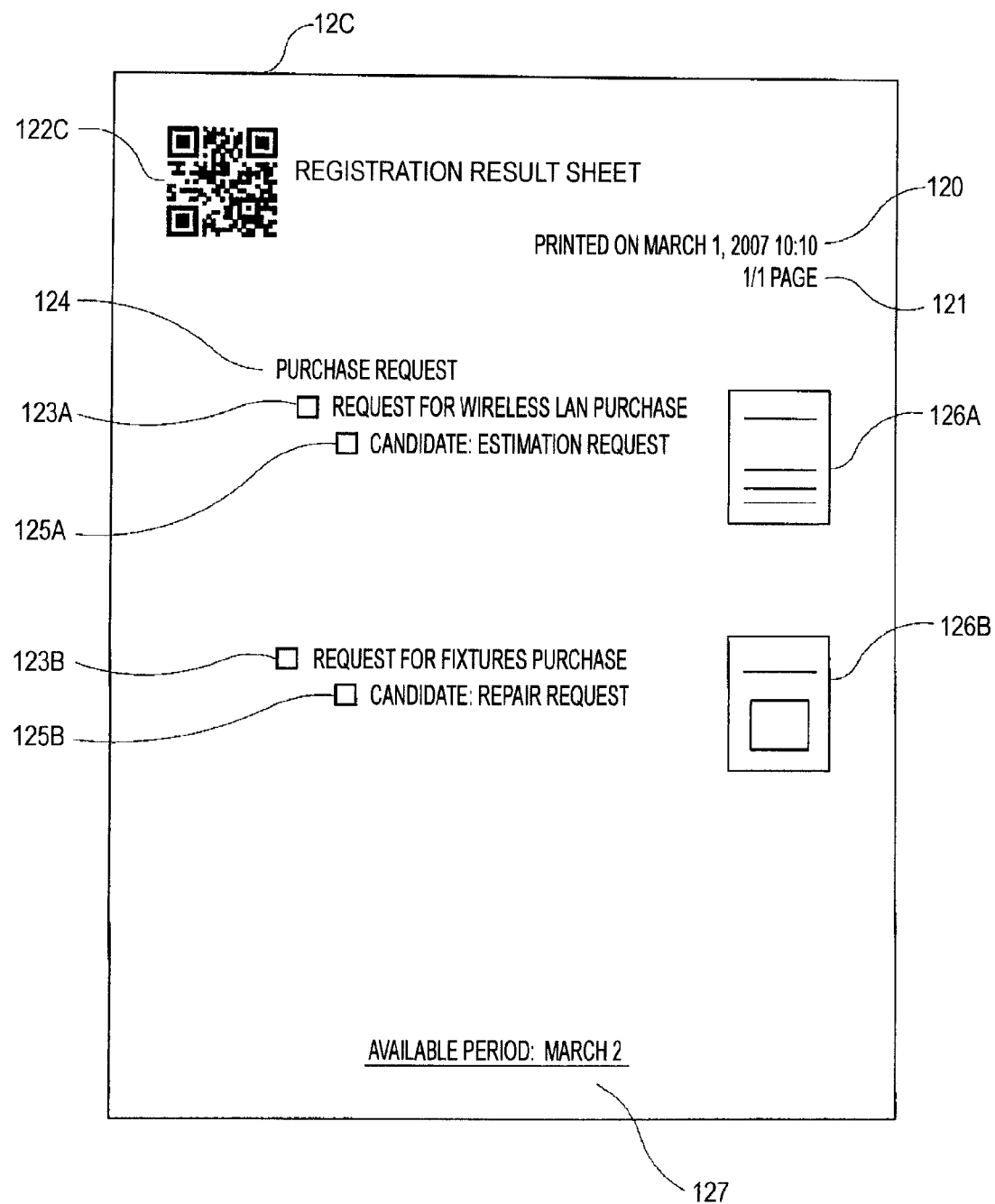
FIG. 12 is a diagram showing an example of a registration result sheet in which classification is performed according to storage destinations.

Next, a modification of a registration result sheet to be printed by the compound machine 3 will be described below. FIG. 12 is a diagram showing a modification of a registration result sheet. In the registration result sheet 12A shown in FIG. 7, the title, the storage destination, and the candidates are printed for every electronic document. Meanwhile, in a registration result sheet 12C, the titles and the candidates of the electronic documents are classified according to the selected storage destination and then printed.

That is, in the registration result sheet 12C, for example, for an electronic document of a request for wireless LAN purchase, 'PURCHASE REQUEST' is selected as the storage destination, and 'ESTIMATION REQUEST' is selected as the candidate. In addition, for an electronic document of a request for fixtures purchase, 'PURCHASE REQUEST' is selected as the storage destination. When 'REPAIR REQUEST' is selected as the candidate, the titles of the electronic documents, reselection check boxes 123A and 123B corresponding to the titles, selected candidates, candidate check boxes 125A and 125B corresponding to the candidates, and reduced images 126A and 126B are printed below the storage destination 124 representing 'PURCHASE REQUEST'.

Moreover, the classification unit when the registration result sheet is printed may be, not limited thereto, a user who performs the scan instruction or a group to which the user belongs, time, such as date on which the scan processing is performed, or a device, such as the compound machine 3, which performs the scan processing.

Second Embodiment

Similarly to the document processing system 1 according to the first embodiment of the invention, a document processing system according to a second embodiment of the invention includes a compound machine 3, a document management server 4, and a network 10. In addition, the document processing system according to the second embodiment of the invention further includes a document processing server 2B that registers the electronic documents transmitted from the compound machine 3 to a plurality of storage locations of the document management server 4.

Figure 13:
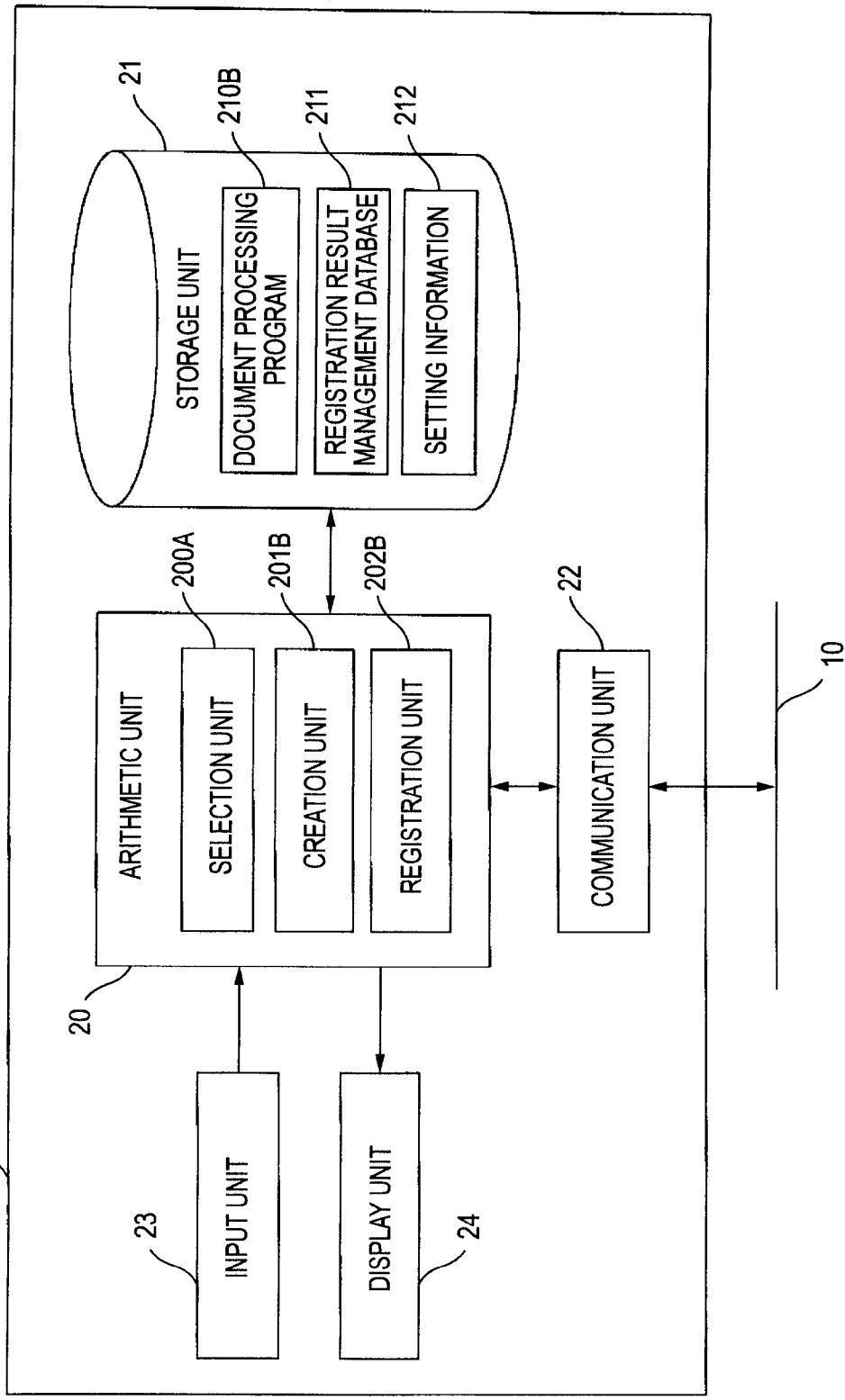
FIG. 13 is a block diagram showing an example of the schematic configuration of a document processing server according to a second embodiment of the invention.

FIG. 13 is a block diagram showing an example of the schematic configuration of the document processing server 2B according to the second embodiment of the invention. The document processing server 2A according to the first embodiment of the invention provides the compound machine 3 with the print information of the registration result sheet, which instructs a single storage location as the storage location of the electronic document. In contrast, the document processing server 2B provides the compound machine 3 with print information for printing a registration result sheet, in which one or more storage locations are selectable as the storage location of the electronic document.

The document processing server 2B includes an arithmetic unit 20 that controls the individual units of the document processing server 2B and is implemented with, for example, a CPU, a storage unit 21 that stores a document processing program 210B, a registration result management database 211, and setting information 212, or various kinds of data, and is implemented with a ROM, a RAM, or an HDD, a communication unit 22 that is connected to the network 10 to perform data transmission/reception and is implemented with, for example, a network interface card, an input unit 23 that receives data input or an operation instruction and is implemented with a keyboard or a mouse, and a display unit 24 that displays a processing result of the arithmetic unit 20 and is implemented with an LCD (Liquid Crystal Display).

The arithmetic unit 20 operates according to the document processing program 210B stored in the storage unit 21 and functions as a selection unit 200A, a creation unit 201B, and a registration unit 202B. The selection unit 200A is the same as that in the first embodiment, and the description thereof will be omitted.

The creation unit 201B creates print information for printing a registration result sheet, in which one or more storage locations are selectable as the storage location of the electronic document. Then, the creation unit 201B transmits the created print information to the compound machine 3 by the communication unit 22 through the network 10.

Figure 14:
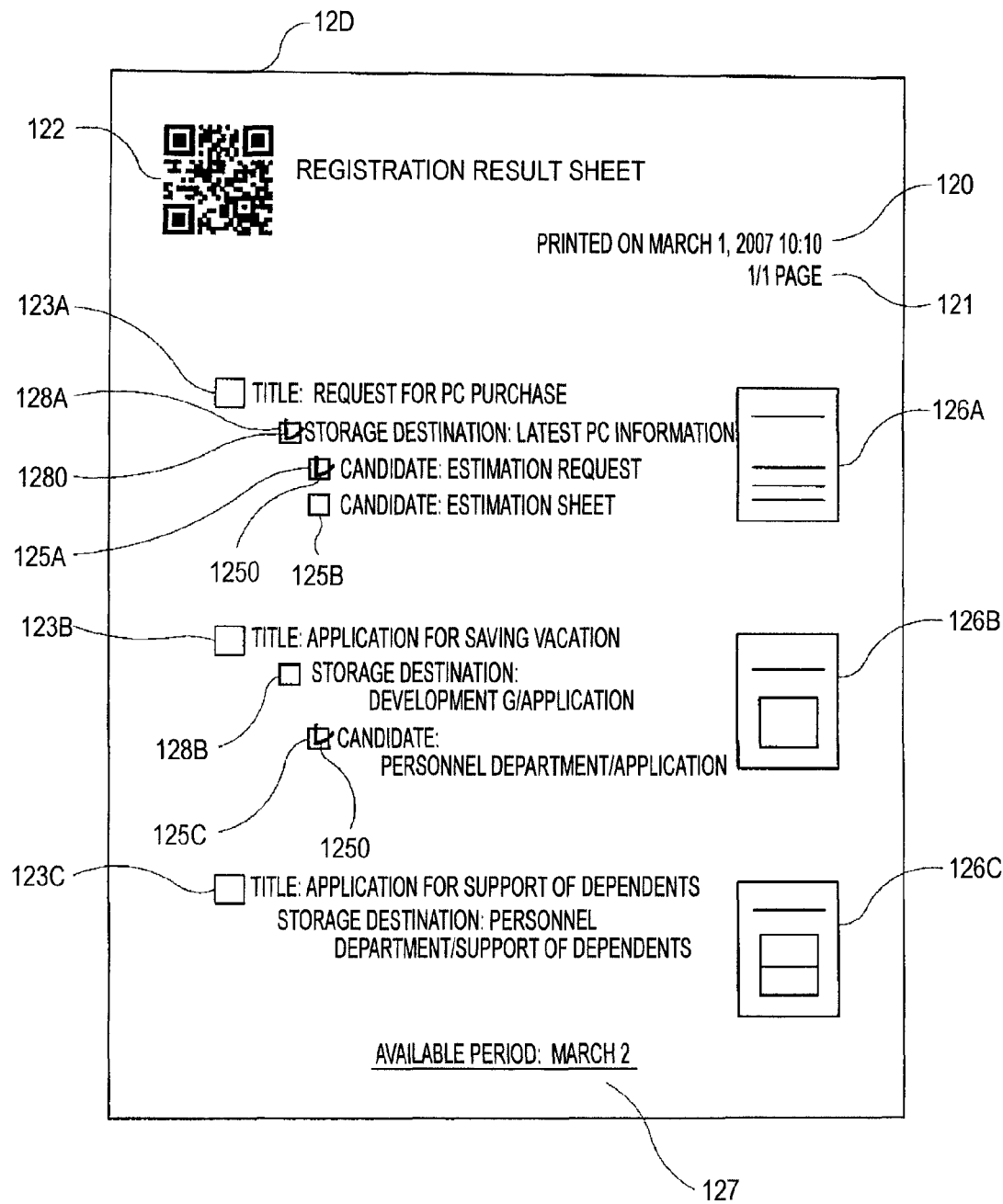
FIG. 14 is a diagram showing an example of a registration result sheet in which a deletion instruction can be performed.

FIG. 14 is a diagram showing an example of a registration result sheet that is printed by the printing unit 33 of the compound machine 3. A registration result sheet 12D has the same layout as the registration result sheet 12A shown in FIG. 7. In an upper portion of the registration result sheet 12D, print date and time 120, the number of pages 121, and a QR code 122 are printed. In a central portion thereof, the titles, the storage destinations, the candidates, and the reduced images 126A to 126C of the individual electronic documents are printed. In addition, in a lower portion thereof, an available period 127 representing a period, in which the user has to process the registration result sheet 12D, is printed.

In the central portion of the registration result sheet 12D, reselection check boxes 123A to 123C arranged on the left sides of the titles of the individual electronic documents, candidate check boxes 125A to 125C arranged on the left sides of the individual candidates, and deletion check boxes 128A and 128B arranged on the lest sides of the individual storage destinations are printed.

In regards to the deletion check boxes 128A and 128B, when the user wants to delete the electronic document from the storage destination corresponding to the deletion check box 128A or 128B, he/she puts a deletion instruction marking 1280 in the corresponding check box.

Figure 15:
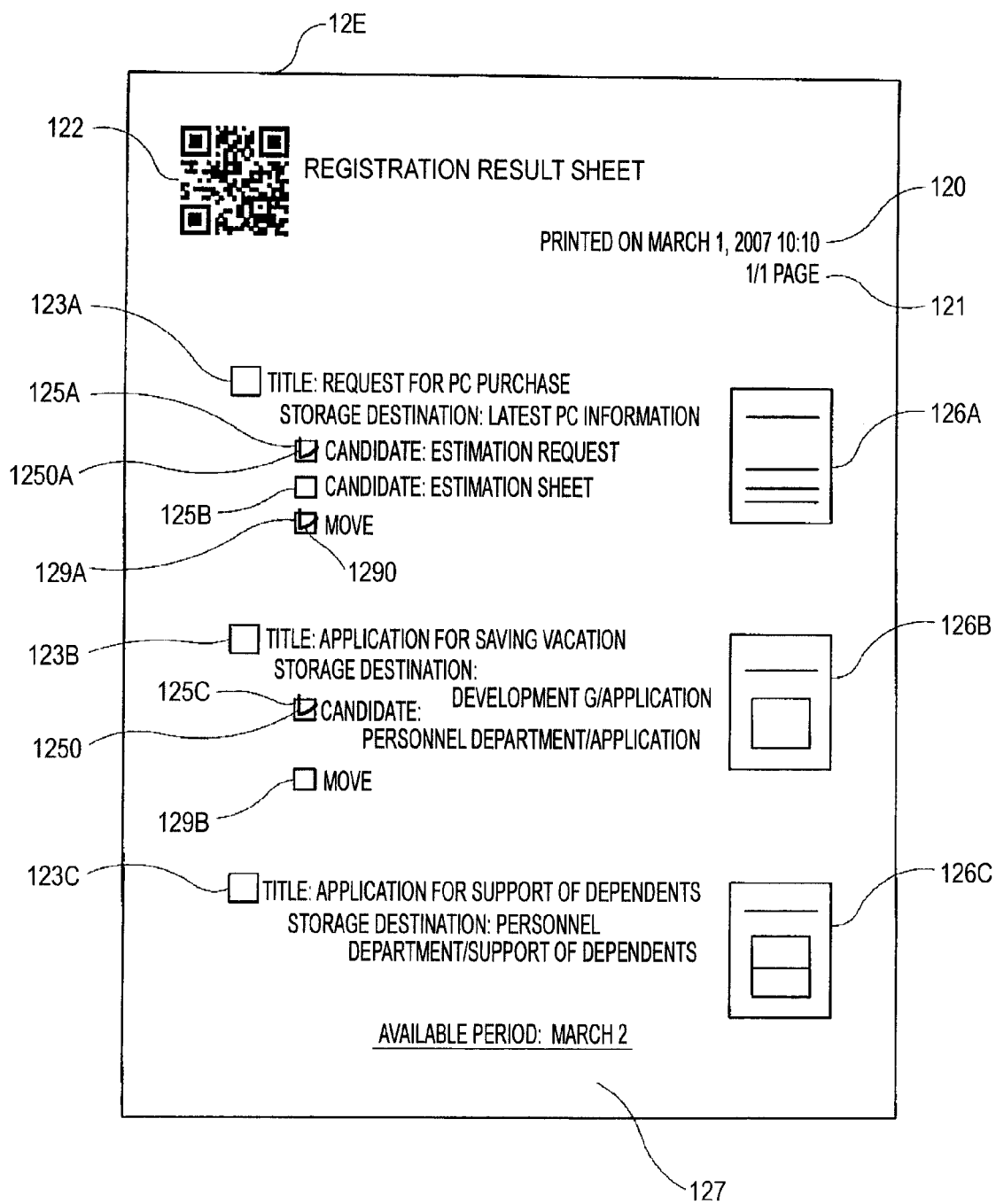
FIG. 15 is a diagram showing an example of a registration result sheet in which a move instruction can be performed.

FIG. 15 is a diagram showing a modification of a registration result sheet. A registration result sheet 12E has the same layout as the registration result sheet 12D shown in FIG. 14. In the registration result sheet 12E, move check boxes 129A and 129B are printed below the candidates of the electronic documents, which are printed in the central portion thereof.

In regards to the move check boxes 129A and 129B, when the user wants to move the electronic document from the storage destination to the candidate, he/she puts a move instruction marking 1290 in the corresponding check box.

The registration unit 202B receives, from the arithmetic unit 20, information on presence/absence of the deletion instruction marking 1280 and the move instruction marking 1290, which is acquired by the arithmetic unit 20 through an analysis processing on the registration result sheet. Then, on the basis of the information, the registration unit 202B registers the electronic document to one or more storage locations as the storage location of the electronic document.

For example, as shown in FIG. 14, when receiving, from the arithmetic unit 20, information on the deletion instruction marking 1280 in connection with the storage destination 'LATEST PC INFORMATION' of the request for PC purchase and the change instruction marking 1250 in connection with the candidate 'ESTIMATION REQUEST', the registration unit 202B moves the electronic document of the request for PC purchase from the storage destination 'LATEST PC INFORMATION' to the candidate 'ESTIMATION REQUEST'.

In addition, when receiving information on the change instruction marking 1250 in connection with the candidate 'PERSONNEL DEPARTMENT/APPLICATION' of the application for saving vacation, the registration unit 202B copies the electronic document of the application for saving vacation to the candidate 'PERSONNEL DEPARTMENT/APPLICATION'. That is, the electronic document of the application for saving vacation is registered to the two storage locations of the storage destination 'DEVELOPMENT G/APPLICATION' and the candidate 'PERSONNEL DEPARTMENT/APPLICATION'.

Referring to FIG. 15, when receiving information on the change instruction marking 1250 in connection with the candidate 'ESTIMATION REQUEST' of the request for PC purchase and the move instruction marking 1290 in the move check box 129A, the registration unit 202B moves the electronic document of the request for PC purchase from the storage destination 'LATEST PC INFORMATION' to the candidate 'ESTIMATION REQUEST'.

In addition, when receiving information on the change instruction marking 1250 in connection with the candidate 'PERSONNEL DEPARTMENT/APPLICATION' of the application for saving vacation and the move instruction marking 1290 in the move check box 129B, the registration unit 202B copies the electronic document of the application for saving vacation to the candidate 'PERSONNEL DEPARTMENT/APPLICATION'. That is, the electronic document of the application for saving vacation is registered to the two storage locations of the storage destination 'DEVELOPMENT G/APPLICATION' and the candidate 'PERSONNEL DEPARTMENT/APPLICATION'.

Third Embodiment

Figure 16:
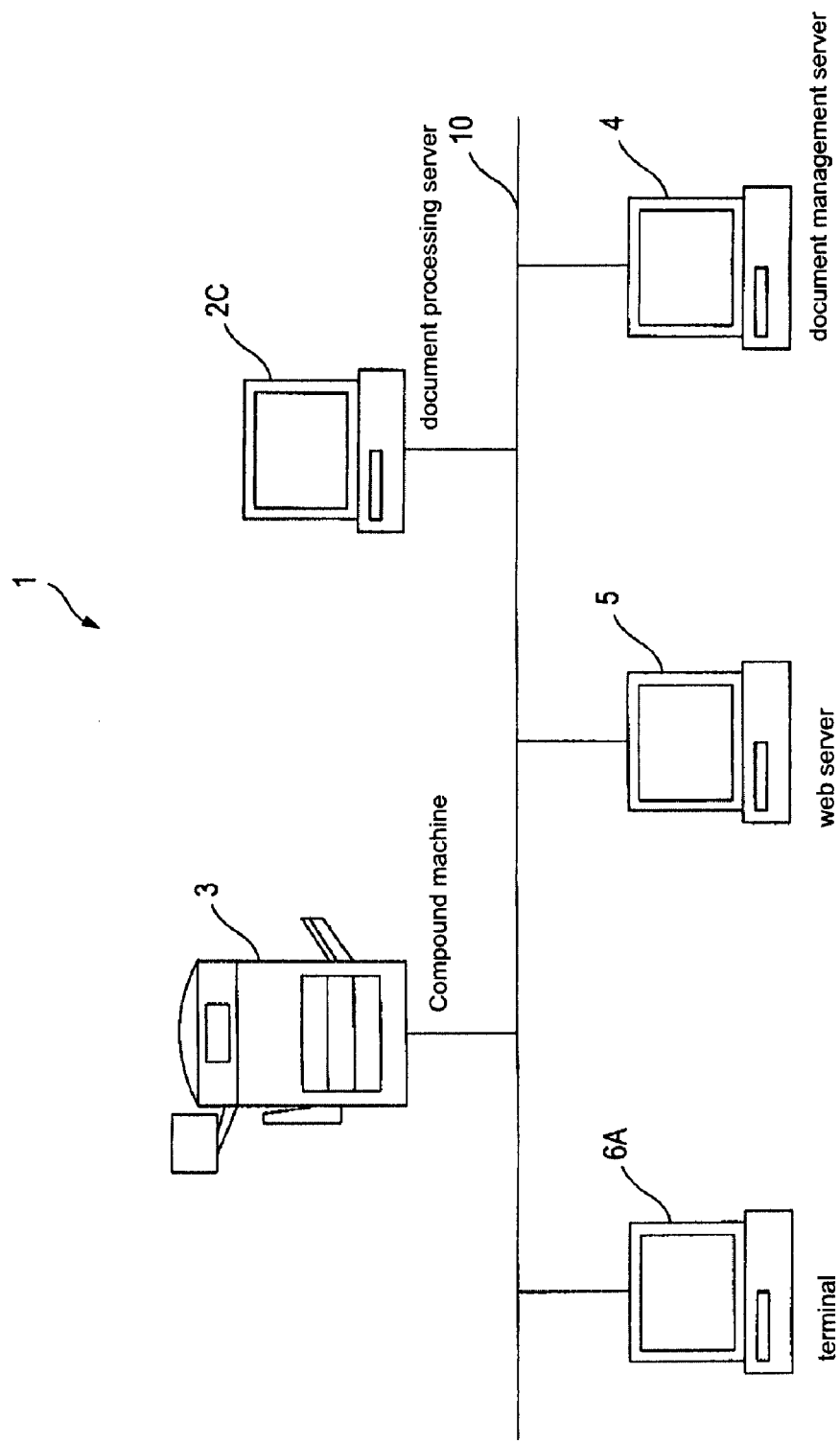
FIG. 16 is an overall view showing an example of the schematic configuration of a document processing system according to a third embodiment of the invention.

FIG. 16 is an overall view showing an example of the schematic configuration of a document processing system according to a third embodiment of the invention. In the document processing system 1 according to the first embodiment of the invention, the compound machine 3 prints the registration result sheet on the basis of the print information transmitted from the document processing server 2A. In contrast, in the document processing system 1 according to the third embodiment of the invention, a Web server 5 stores Web page information transmitted from a document processing server 2C, and transmits the Web page information to a terminal 6A according to the demand of the terminal 6A. Then, a registration result screen is displayed on the terminal 6A.

Similarly to the document processing system 1 according to the first embodiment of the invention, the document processing system according to the third embodiment of the invention includes a compound machine 3, a document management server 4, and a network 10. In addition, the document processing system according to the third embodiment of the invention further includes the document processing server 2C that transmits, to the Web server 5, Web page information, which is created from the registration result information, the Web server 5 that transmits the Web page information to the terminal 6A according to the demand of the terminal 6A, and the terminal 6A that displays the registration result screen on the basis of the Web page information transmitted from the Web server 5.

Here, the term 'Web page information' means information that is described in a markup language, such as HTML (Hyper Text Markup Language) or XML (Extensible Markup Language) to display a Web page on a Web browser.

(Document Processing Server)

Figure 17:
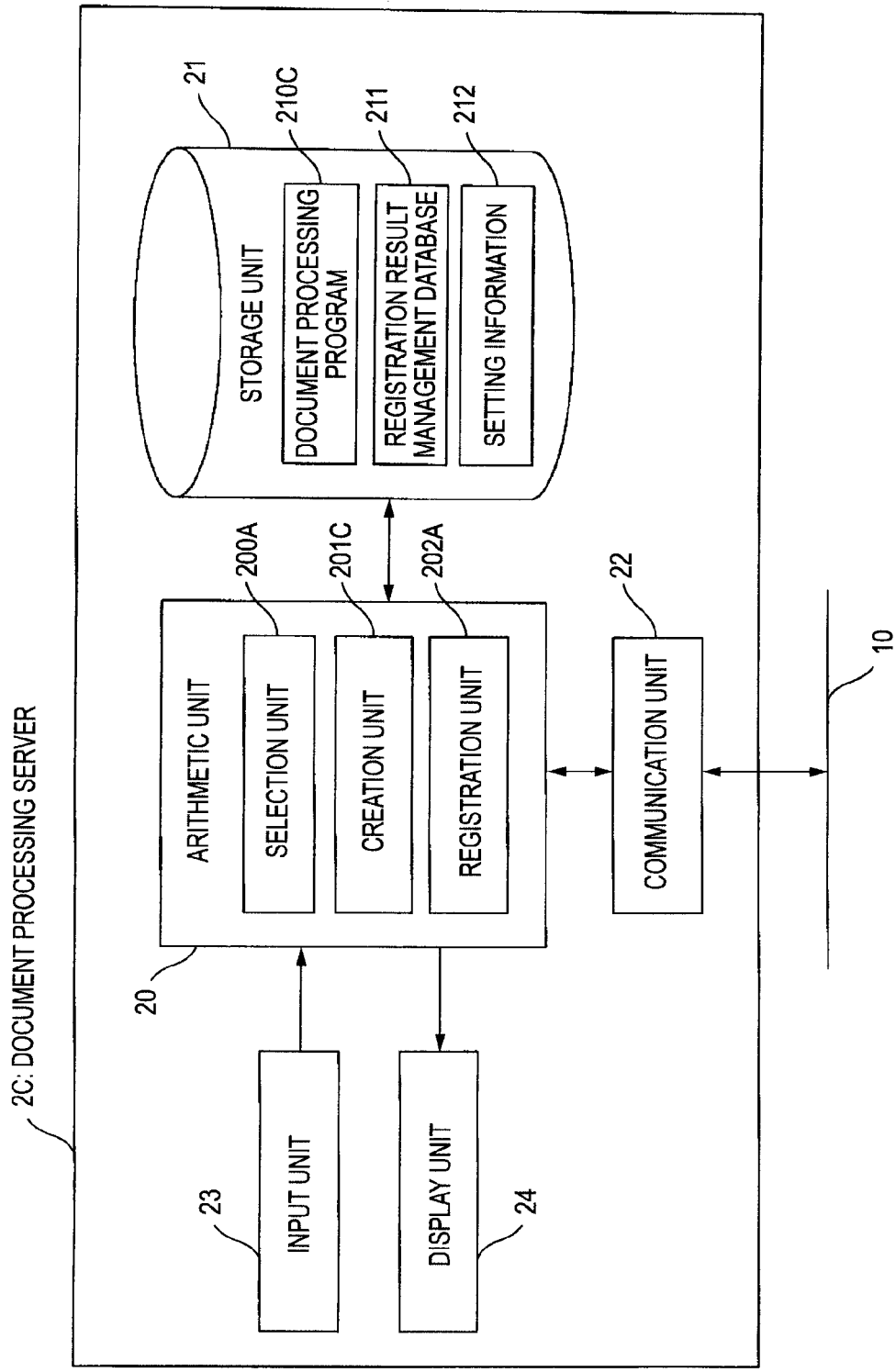
FIG. 17 is a block diagram showing an example of the schematic configuration of a document processing server according to the third embodiment of the invention.

FIG. 17 is a block diagram showing an example of the schematic configuration of the document processing server 2C. The document processing server 2C includes an arithmetic unit 20 that controls the individual units of the document processing server 2C and is implemented with, for example, a CPU, a storage unit 21 that stores a document processing program 210C, a registration result management database 211, and setting information 212, or various kinds of data, and is implemented with a ROM, a RAM, or an HDD, a communication unit 22 that is connected to the network 10 to perform data transmission/reception and is implemented with, for example, a network interface card, an input unit 23 that receives data input or an operation instruction and is implemented with a keyboard or a mouse, and a display unit 24 that displays a processing result of the arithmetic unit 20 and is implemented with, for example, an LCD (Liquid Crystal Display).

The arithmetic unit 20 operates according to the document processing program 210C stored in the storage unit 21 and functions as a selection unit 200A, a creation unit 201C, and a registration unit 202A. The selection unit 200A and the registration unit 202A are the same as those in the first embodiment, and the descriptions thereof will be omitted.

The creation unit 201C creates registration result information including information on an electronic document to be registered and identification information of a storage destination and candidates selected by the selection unit 200A. Then, the creation unit 201C transmits, to the Web server 5, the Web page information for displaying the created registration result information on the Web browser.

(Web Server)

The Web server 5 includes an arithmetic unit that controls the individual units of the Web server 5 and is implemented with, for example, a CPU, a communication unit that is connected to the network 10 and implemented with, for example, a network interface card, and a storage unit that stores a program, such as a Web page transmission program, which transmits the Web page information according to the demand of the terminal 6A, or data, such as the Web page information, and is implemented with a ROM, a RAM, or an HDD.

(Terminal)

The terminal 6A includes a CPU that controls the individual units of the terminal 6A, a storage unit that stores a program, such as a Web browser, or data and is implemented with a ROM, a RAM, or an HDD, a communication unit that is connected to the network 10 and is implemented with, for example, a network interface card, an input unit that receives data input or an operation instruction and is implemented with a keyboard or a mouse, and a display unit that displays the registration result screen on the browser on the basis of the Web page information transmitted from the Web server 5 and is implemented with an LCD (Liquid Crystal Display). The terminal 6A may be, for example, a personal computer (PC) or a personal digital assistant (PDA).

Operation of Third Embodiment

Next, an example of the operation of the document processing system 1 according to the third embodiment of the invention will be described with reference to FIGS. 18 and 19. Here, similarly to the first embodiment, a case where the user reads three documents of a request for PC purchase, an application for saving vacation, and an application for support of dependents by the compound machine 3 and registers the electronic documents in a document management server 4 will be described with reference to a flowchart of FIG. 19.

(1) Storage Destination Selection

First, if the user sets a document to be scanned on the original placing stand of the compound machine 3, an authentication screen on which the user inputs user information including a user name and a password is displayed on the display operation unit 34 (Step S201).

Next, if the user inputs the user information on the authentication screen by the display operation unit 34, the CPU 30 of the compound machine 3 determines whether or not to permit authentication on the basis of the input user information. When the authentication is not permitted, a purport that the authentication is not permitted is displayed on the display operation unit 34 and the process ends. Meanwhile, when the authentication is permitted, the CPU 30 displays, on the display operation unit 34, a confirmation message on whether or not to perform new registration of an electronic document (Step S101).

Next, the user inputs a purport to perform new registration by the display operation unit 34 in response to the confirmation message, and performs a scan instruction (Step S101: Yes).

Next, when receiving the scan instruction, the CPU 30 reads the document set on the original placing stand by the photoelectric conversion element of the reading unit 32, and then transmits the read electronic document and the user information to the document processing server 2C by the network communication unit 35 through the network 10.

Next, when receiving the electronic document and the user information transmitted from the compound machine 3 through the communication unit 22, the arithmetic unit 20 of the document processing server 2C transmits the received electronic document to the selection unit 200A.

Next, the selection unit 200A selects the storage destination and the candidates, to which the electronic document is registered in the document management server 4, on the basis of image information of the read electronic document from the arithmetic unit 20 (Step S102).

Next, the selection unit 200A notifies the registration unit 202A of the selected storage destination. Then, the registration unit 202A registers the electronic document in the storage unit of the document management server 4 corresponding to the storage destination (Step S103).

Next, the selection unit 200A adds a new record, in which the selected storage destination and candidates are stored as the registration result information, to the registration result management table 211b of the registration result management database 211 (Step S104).

Next, the creation unit 201C creates the Web page information on the basis of the storage destination and the candidates selected by the selection unit 200A, and transmits the user information transmitted from the compound machine 3 to the Web server 5, together with the Web page information. Then, when receiving the Web page information and the user information, the arithmetic unit of the Web server 5 stores the received Web page information in the storage unit of the Web server 5 for each user represented by the user information (Step S204).

In this way, in regards to the three documents of the request for PC purchase, the application for saving vacation, and the application for support of dependents, the storage destinations and the candidates are selected. Then, the documents are correspondingly registered to the storage destinations, and the Web page information of the Web server 5 is updated.

(2) Registration Result Screen Display and Input

If the user operates the terminal 6A to start the Web browser by the input unit and accesses a URL (Uniform Resource Locator) for displaying the registration result information, the CPU of the terminal 6A controls the display unit to display the authentication screen. Next, if the user inputs the user information on the display authentication screen and the authentication is successful (Step S201), the confirmation message is displayed on the display unit. Then, the user inputs a purport not to perform new registration in response to the confirmation message (Step S101: No).

Next, if the user performs a display instruction of the registration result screen by the input unit, the CPU of the terminal 6A transmits the user information and the display instruction to the Web server 5 through the network 10. Moreover, the display instruction of the registration result screen may be performed by the display operation unit 34 of the compound machine 3.

Next, when receiving the user information and the display instruction, the arithmetic unit of the Web server 5 reads the Web page information corresponding to the user represented by the user information, and transmits the read Web page information to the terminal 6A.

Next, when the CPU of the terminal 6A receives the Web page information, the Web browser analyzes the Web page information and displays the registration result screen on the display unit of the terminal 6A.

Figure 18:
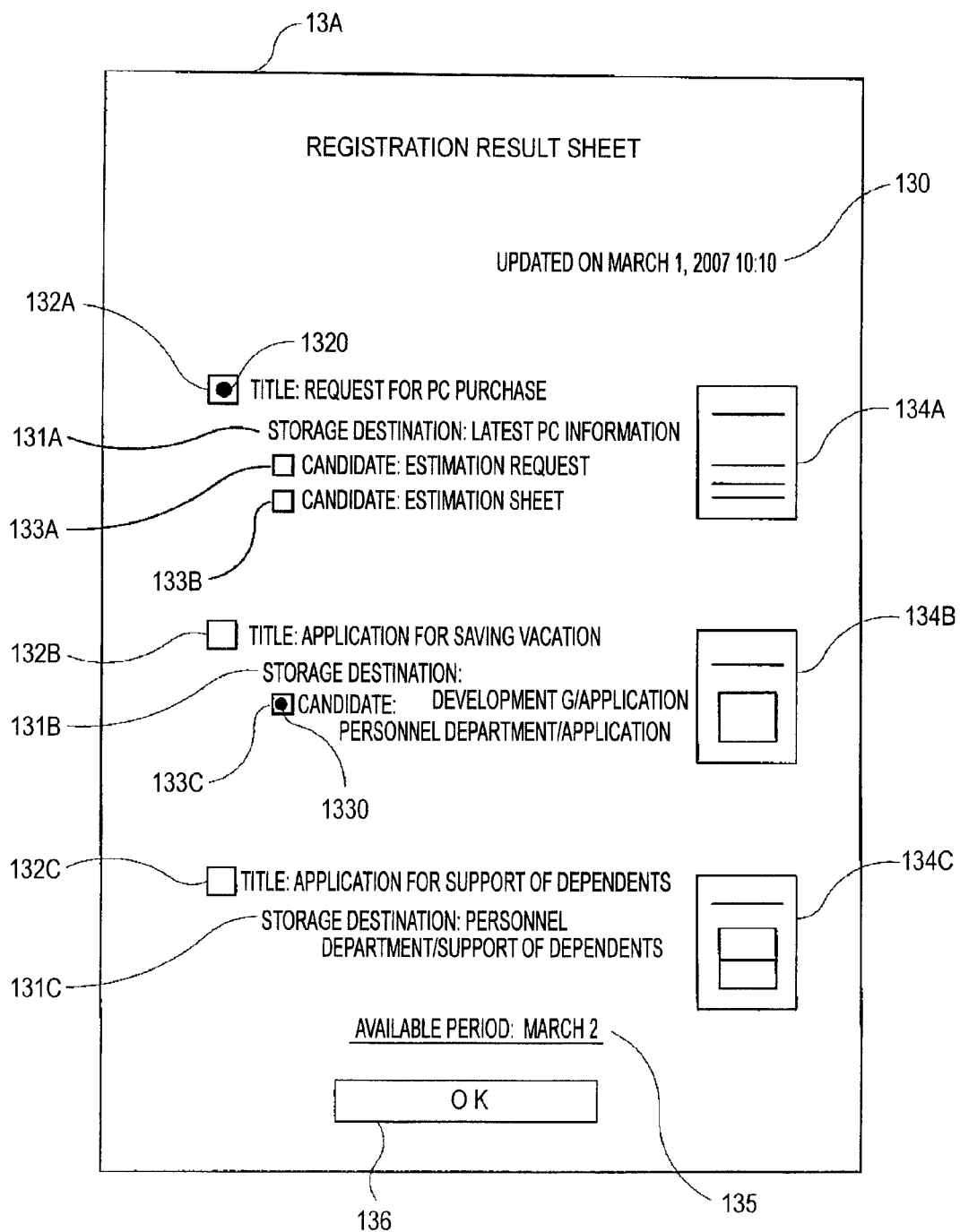
FIG. 18 is a diagram showing an example of a registration result screen.
Figure 19:
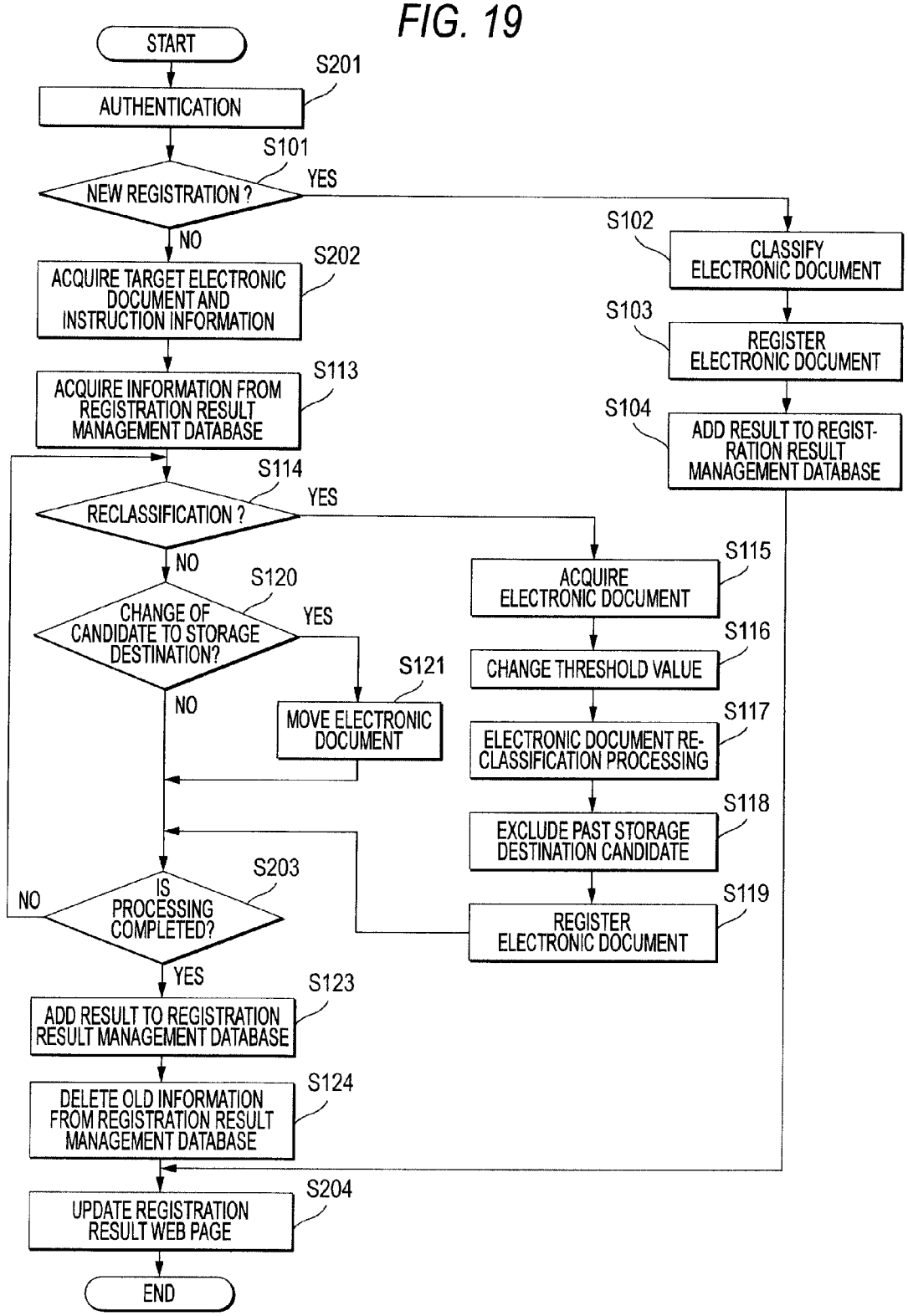
FIG. 19 is a flowchart showing an example of the operation of the document processing system according to the third embodiment of the invention.

FIG. 18 is a diagram showing an example of a registration result screen that is displayed on the display unit of the terminal 6A. In an upper portion of a registration result screen 13A, display date and time 130 representing date and time at which the registration result screen 13A is displayed. In a central portion thereof, the registration result information on the three electronic documents of the request for PC purchase, the application for saving vacation, and the application for support of dependents is displayed. In addition, in a lower portion thereof, an available period 135 representing a period, in which the user has to process the registration result screen 13A, and an OK button 136 for completing an input on the registration result screen 13A are displayed.

In the central portion of the registration result screen 13A, the titles of the request for PC purchase, the application for saving vacation, and the application for support of dependents, the storage destinations 131A to 131C, and the candidates are displayed according to the documents. In addition, reselection check boxes 132A to 132C arranged on the left sides of the individual titles, candidate check boxes 133A to 133C arranged on the left sides of the individual candidates, and reduced images 134A to 134C, which show the individual electronic documents on reduced scales, are displayed.

Next, the user views the displayed registration result screen 13A and confirms the storage destinations 131A to 131C, to which the electronic documents are registered, respectively. Then, for example, when the user changes the storage destination of the electronic document to the candidate, he/she puts a reselection instruction check mark 1320 in a corresponding one of the reselection check boxes 132A to 132C. In addition, when the user reselects the storage destination and the candidates of the electronic document, he/she puts a change instruction check mark 1330 in a corresponding one of the candidate check boxes 133A to 133C.

Then, if the user presses the OK button 136 that is provided in the lower portion of the registration result screen 13A, the CPU of the terminal 6A transmits positional information that represents the positions of the reselection instruction check box 1320 and the change instruction check box 1330 input by the user.

(3) Registration Result Screen Content Reflection

When receiving the positional information from the terminal 6A, the arithmetic unit of the Web server 5 acquires reselection instruction information and change instruction information, which represent presence/absence of the reselection instruction check mark 1320 and the change instruction check mark 1330 in connection with each electronic document, respectively, on the basis of the positional information and the Web page information (Step S202).

Then, the arithmetic unit of the Web server 5 transmits a document ID, which represents the electronic document corresponding to the instruction information, to the document processing server 2C, together with the acquired reselection instruction information and the change instruction information.

Next, if the arithmetic unit 20 of the document processing server 2C receives the information from the Web server 5 and transmits the received information to the registration unit 202A, the registration unit 202A acquired the storage destination and the candidates from the registration result management table 211b with the document ID as a key (Step S113).

Next, the registration unit 202A determines, on the basis of the acquired reselection instruction information, whether or not to perform storage destination reselection for each electronic document (Step S114). When determining to perform storage destination reselection (Step S114: Yes), the registration unit 202A acquires the electronic document from the storage destination, to which the electronic document is previously registered (Step S115). In addition, the registration unit 202A transmits the acquired electronic document to the selection unit 200A and instructs to reselect the storage destination and the candidates.

Next, when receiving the electronic document and the reselection instruction, similarly to the first embodiment, the selection unit 200A changes, by a variation in threshold value in the setting information 212, a threshold value when the storage destination is selected (Step S116), and selects the storage destination and the candidates again (Step S117).

Next, the arithmetic unit 20 excludes the past storage destination and candidate, which are stored in the registration result management table 211b, among the storage destinations and the candidates selected by the selection unit 200A (Step S118). Then, the registration unit 202A moves the electronic document from the storage destination, to which the electronic document is registered, to the storage destination reselected by the selection unit 200A (Step S119).

At Step S114, when determining not to perform the storage destination reselection (Step S114: No), the registration unit 202A determines, on the basis of the acquired change instruction information, whether or not to change the storage destination of the electronic document to the candidate (Step S120).

Then, when the registration unit 202A determines to change the storage destination of the electronic document to the candidate (Step S120: Yes), the electronic document is moved to the candidate that is instructed as the storage destination (Step S121).

At Step S120, when determining not to change the storage destination of the electronic document to the candidate (Step S120: No), the registration unit 202A determines whether or not the processing on the acquired reselection instruction information and change instruction information is completed (Step S203). When the processing is not completed, the process returns to Step S114. Meanwhile, when the processing is completed, the process progresses to Step S123.

Next, the registration unit 202A reflects the reselection result of the storage destination and the candidates at Steps S117 and S118 in the registration result management database 211. In addition, the change result of the storage destination to the candidate at Step S121 adds to the registration result management database 211 (Step S123). Then, the registration unit 202A deletes an unnecessary record from the registration result management database 211 (Step S124).

(4) Registration Result Screen Update

The creation unit 201C of the document processing server 2C creates Web page information, in which the reselection result and the change result of the storage destination to the candidate are reflected, and transmits the Web page information and the user information, which is transmitted from the terminal 6A, to the Web server 5. Then, the arithmetic unit of the Web server 5 stores the received Web page information in the storage unit of the Web server 5 for each user, which is represented by the received used information (Step S204). Subsequently, the Web server 5 transmits the updated Web page information to the terminal 6A.

Next, if the CPU of the terminal 6A receives the updated Web page information, the Web browser updates the registration result screen, which is displayed on the display unit of the terminal 6A, on the basis of the Web page information. That is, the reselection result of the storage destination and the candidates of the electronic document, on which the user puts a reselection instruction check mark 1320, is displayed on the updated registration result screen. In addition, in regards to the electronic document, on which the user puts a change instruction check mark 1330, the move result of the electronic document to the candidate, which is instructed as the storage destination, is also displayed.

Then, the user further inputs the reselection instruction check mark 1320 or the change instruction check mark 1330 on the updated registration result screen, such that the electronic document is registered to a desired storage location.

(Modification of Registration Result Screen)

Figure 20:
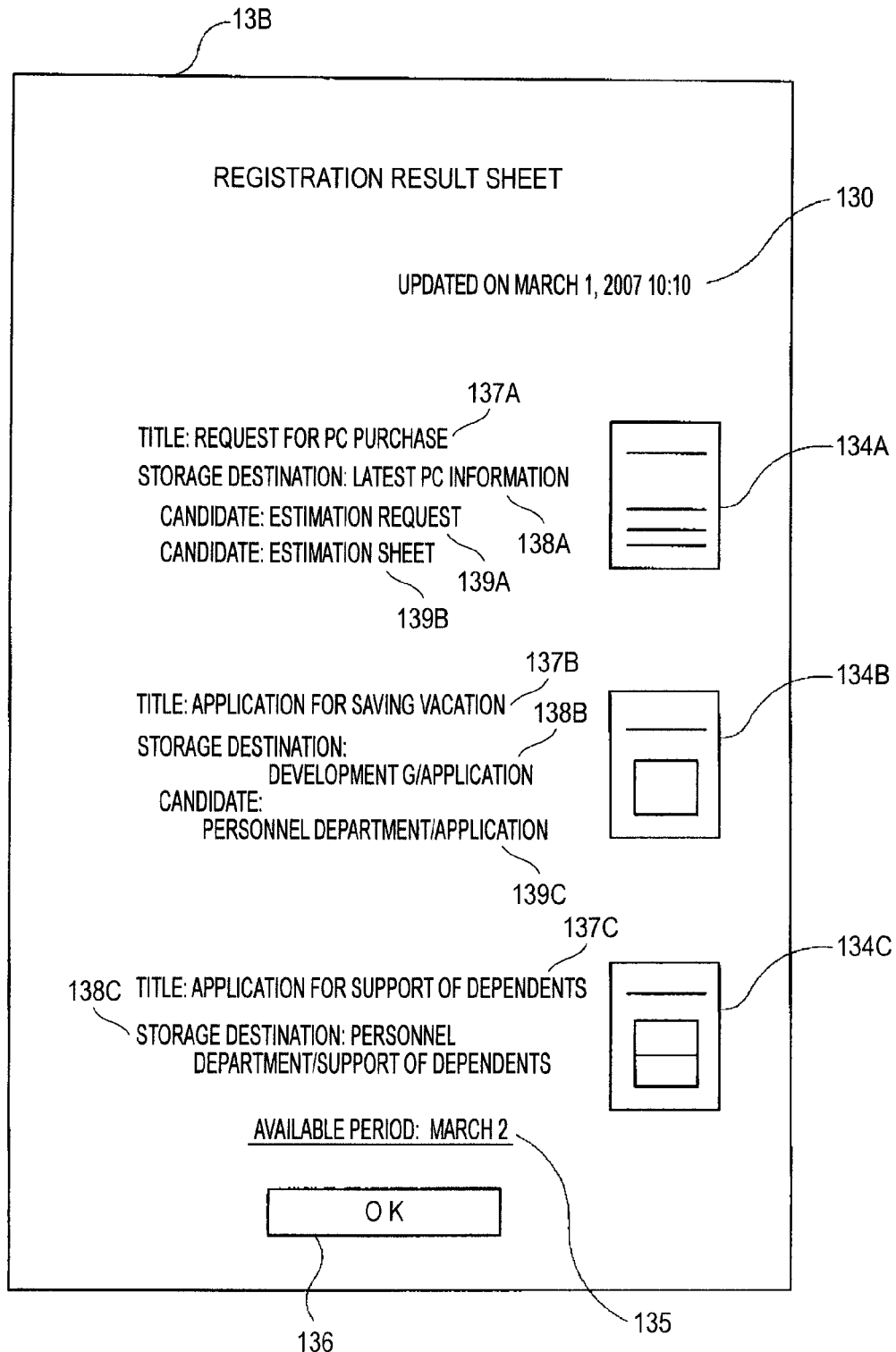
FIG. 20 is a diagram showing an example of a registration result screen in which a hyperlink is provided.

A modification of a registration result screen, which is displayed on the Web browser, will be described below. FIG. 20 is a diagram showing a modification of a registration result screen. On the registration result screen 13A shown in FIG. 18, a reselection instruction or a change instruction is performed by putting a check mark in a check box. Meanwhile, on a registration result screen 13B, a hyperlink is inserted into a character string representing a title, a storage destination, or a candidate, and an instruction is performed by selecting the hyperlink.

In an upper portion of the registration result screen 13B, display date and time 130 is displayed. In a central portion thereof, the titles of the electronic documents are displayed. Further, reselection instruction links 137A to 137C, each of which instructs to reselect a corresponding electronic document when being selected, the storage destinations, deletion instruction links 138A to 138C, each of which instructs to delete a corresponding electronic document when being selected, and the candidates are displayed, and change instruction links 139A to 139C, each of which instructs to change the storage destination of a corresponding electronic document to the candidate when being selected, are displayed. In a lower portion thereof, an available period 135 is displayed.

Moreover, hyperlinks may be inserted into reduced images 134A to 134C, and when each reduced image is selected, the reselection may be performed or a corresponding electronic document may be displayed. In addition, in the registration result screens 13A and 13B, the check boxes and the hyperlinks may be used in combination.

Furthermore, in the registration result screen 13B, the OK button 136 may not be provided, and when one of the reselection instruction link 137A to 137C inserted into the titles is selected, the reselection instruction information may be transmitted to the Web server 5. In addition, when one of the change instruction links 139A to 139C inserted into the candidates is selected, the change instruction information may be transmitted to the Web server 5.

Fourth Embodiment

Figure 21:
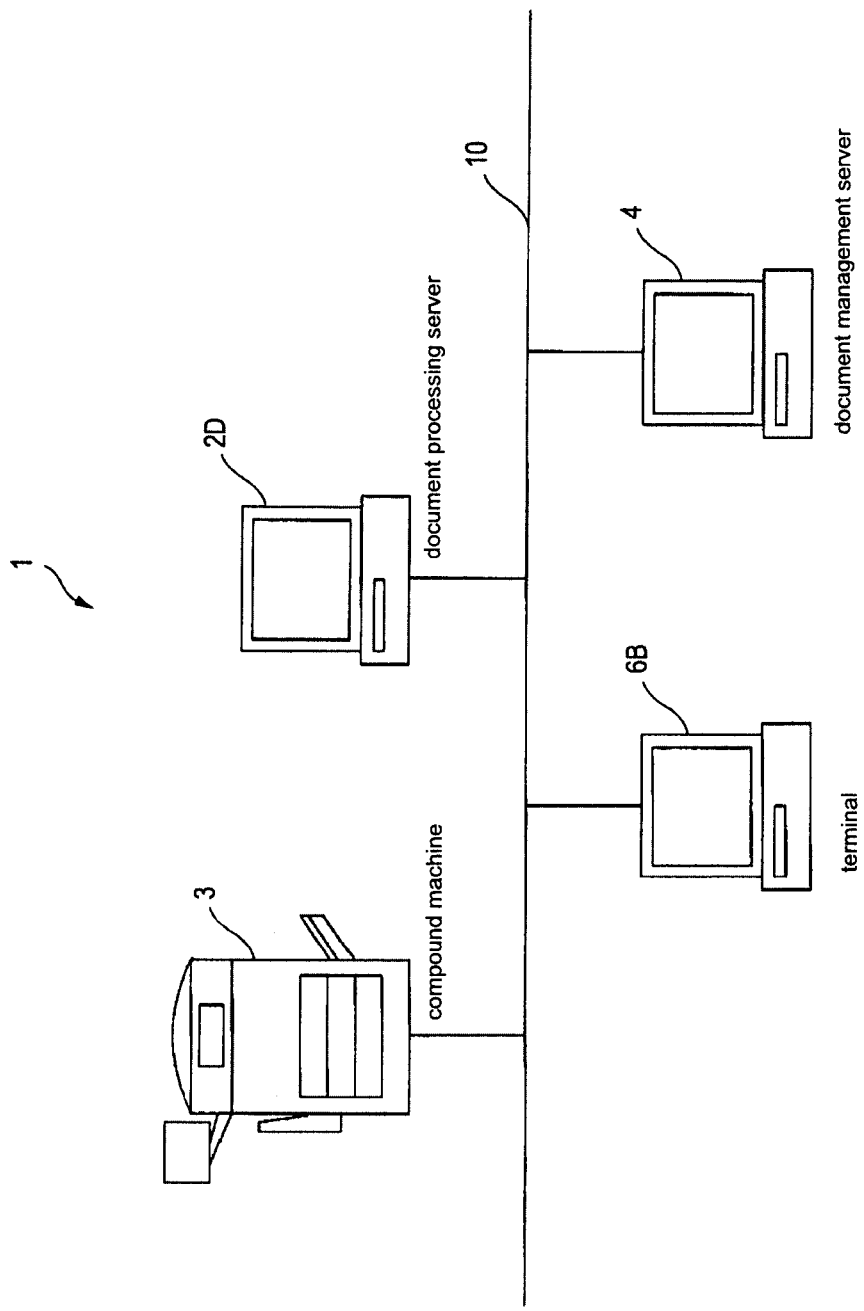
FIG. 21 is an overall view showing an example of the schematic configuration of a document processing system according to a fourth embodiment of the invention.

FIG. 21 is an overall view showing an example of the schematic configuration of a document processing system according to a fourth embodiment of the invention. In the document processing system 1 according to the third embodiment of the invention, the Web server 5 creates the Web page information on the basis of the registration result information from the document processing server 2C, and the terminal 6A displays the registration result screen on the basis of the Web page information. Meanwhile, in the document processing system 1 according to the fourth embodiment of the invention, a document processing server 2D transmits registration result information to a terminal 6B by an electronic mail, and the terminal 6B displays a registration result mail screen on the basis of the electronic mail.

Similarly to the document processing system 1 according to the first embodiment of the invention, the document processing system according to the fourth embodiment of the invention includes a compound machine 3, a document management server 4, and a network 10. In addition, the document processing system according to the fourth embodiment of the invention further includes the document processing server 2D that transmits registration result information by an electronic mail, and the terminal 6B that displays a registration result mail screen on the basis of the electronic mail transmitted from the document processing server 2D.

(Document Processing Server)

Figure 22:
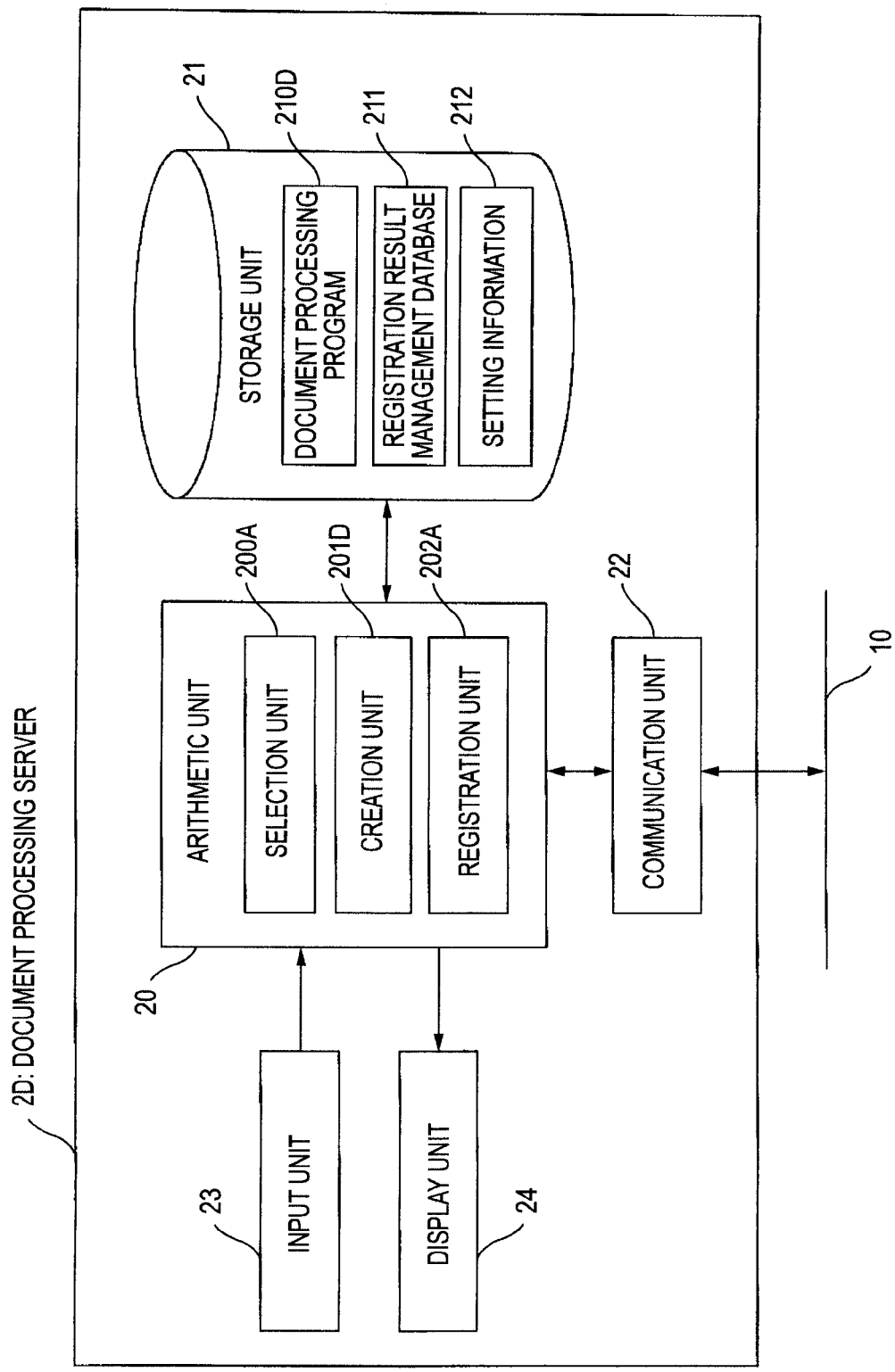
FIG. 22 is a block diagram showing an example of the schematic configuration of a document processing server according to the fourth embodiment of the invention.

FIG. 22 is a block diagram showing an example of the schematic configuration of the document processing server 2D. The document processing server 2D includes an arithmetic unit 20 that controls the individual units of the document processing server 2D and is implemented with, for example, a CPU, a storage unit 21 that stores a document processing program 210D, a registration result management database 211, and setting information 212, or various kinds of data, and is implemented with a ROM, a RAM, or an HDD, a communication unit 22 that is connected to the network 10 to perform data transmission/reception and is implemented with, for example, a network interface card, an input unit 23 that receives data input or an operation instruction and is implemented with a keyboard or a mouse, and a display unit 24 that displays a processing result of the arithmetic unit 20 and is implemented with an LCD (Liquid Crystal Display).

The arithmetic unit 20 operates according to the document processing program 210D stored in the storage unit 21 and functions as a selection unit 200A, a creation unit 201D, and a registration unit 202A. The selection unit 200A and the registration unit 202A are the same as those in the first embodiment of the invention, and the descriptions thereof will be omitted.

The creation unit 201D creates registration result information including information on an electronic document to be registered and identification information of a storage destination and candidates selected by the selection unit 200A, and transmits the registration result information to the terminal 6B by an electronic mail.

(Terminal)

The terminal 6B includes a CPU that controls the individual units of the terminal 6B, a storage unit that stores a program, such as a mailer, which transmits/receives an electronic mail, or data, and is implemented with a ROM, a RAM, or an HDD, a communication unit that is connected to the network 10 and implemented with, for example, a network interface card, an input unit that receives data input or an operation instruction and is implemented with a keyboard or a mouse, and a display unit that displays a registration result screen on the basis of an electronic mail transmitted from the document processing server 2D and is implemented with an LCD (Liquid Crystal Display).

Operation of Fourth Embodiment

Next, an example of the operation of the document processing system 1 according to the fourth embodiment of the invention will be described with reference to FIGS. 23A to 25. Here, similarly to the first embodiment, a case where the user reads three documents of a request for PC purchase, an application for saving vacation, and an application for support of dependents by the compound machine 3, and registers the electronic documents in the document management server 4 will be described with reference to flowcharts of FIGS. 24 and 25.

(1) Storage Destination Selection

First, if the user sets a document to be scanned on the original placing stand of the compound machine 3, an authentication screen on which the user inputs user information is displayed on the display operation unit 34 (Step S201).

Next, if the user inputs the user information on the authentication screen by the display operation unit 34, the CPU 30 of the compound machine 3 determines, on the basis of the input user information, whether or not to permit authentication. When the authentication is not permitted, a purport that the authentication is not permitted is displayed on the display operation unit 34 and the process ends. Meanwhile, when the authentication is permitted, the CPU 30 displays, on the display operation unit 34, an address input screen on which the user inputs a mail address of a destination, to which the registration result information is to be transmitted.

Next, if the user inputs the mail address on the address input screen, the CPU 30 stores the mail address in the storage unit 31 (Step S301). Moreover, on the address input screen, the mail address of an authenticated user may be automatically input or the previously registered mail address of the destination may be input.

Next, the user performs a scan instruction by the display operation unit 34. Then, when receiving the scan instruction, the CPU 30 reads the document set on the original placing stand by the photoelectric conversion element of the reading unit 32, and transmits address information stored in the storage unit 31 to the document processing server 2D, together with the read electronic document.

Next, if the arithmetic unit 20 of the document processing server 2D receives the electronic document and the address information transmitted from the compound machine 3, the selection unit 200A selects the storage destination and the candidates for registering the electronic document in the document management server 4 on the basis of image information of the received electronic document (Step S102).

Next, the registration unit 202A registers the electronic document in the storage unit of the document management server 4 corresponding to the storage destination selected by the selection unit 200A (Step S103).

Next, the registration unit 200A adds a new record, which stores the selected storage destination and candidates as the registration result information, to the registration result management table 211*b* of the registration result management database 211 (Step S104).

Then, the creation unit 201D transmits a registration result mail including the registration result information to the mail address, which is received from the compound machine 3 as the address information, by an electronic mail (Step S302).

In this way, in regards to the three documents of the request for PC purchase, the application for saving vacation, and the application for support of dependents, the storage destinations and the candidates are selected, and the corresponding registration result information is transmitted by the registration result mail.

(2) Registration Result Mail Display and Return Mail Transmission

The user operates the terminal 6B to start the mailer by the input unit, to thereby display the registration result mail, which is transmitted to the mail address of the user. Next, the CPU of the terminal 6B receives the instruction and starts the mailer to display the authentication screen on the display unit.

Next, if the user inputs the user information on the displayed authentication screen and the authentication is successful, the CPU of the terminal 6B displays the registration result mail screen on the basis of the registration result mail, which is transmitted to the mail address of the user.

Figure 23A:
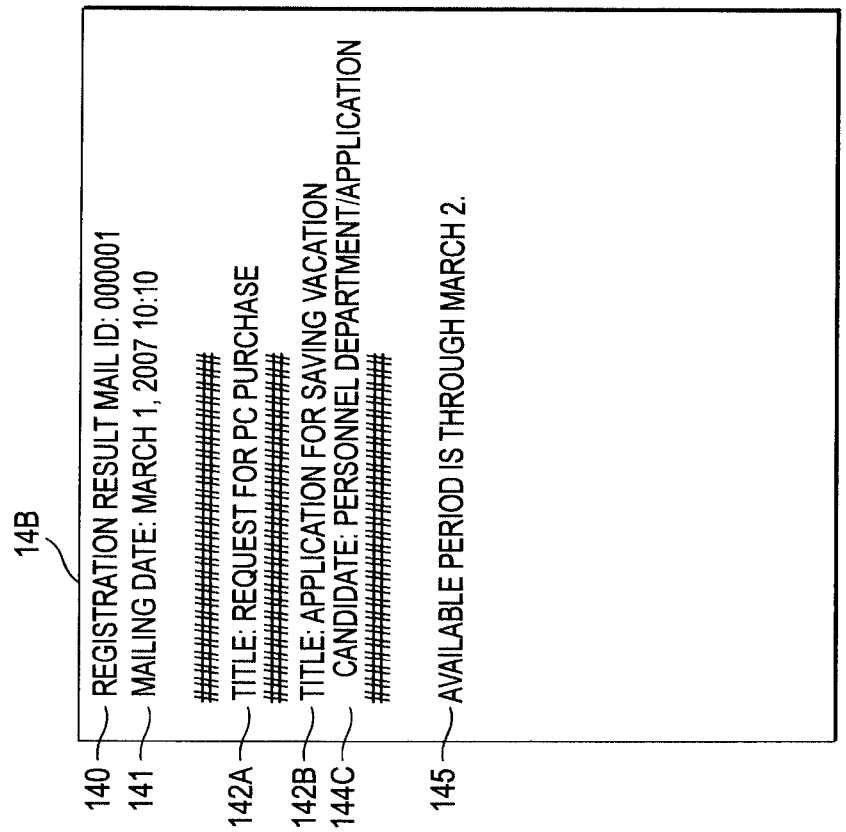
FIG. 23A is a diagram showing an example of a registration result mail screen.

FIG. 23A is a diagram showing an example of a registration result mail screen that is displayed on the display unit of the terminal 6B. In an upper portion of a registration result mail screen 14A, a registration result mail ID 140 that identifies the registration result mail and substitutes for the registration result sheet ID, and a mailing date 141 representing a mailing date of the registration result mail are displayed. In a central portion thereof, the registration result information on the three electronic documents of the request for PC purchase, the application for saving vacation, and the application for support of dependents is displayed. In a lower portion thereof, an available period 145 representing a period in which the user has to return the registration result mail is displayed.

In the central portion of the registration result mail screen 14A, the titles 142A to 142C of the individual electronic documents of the request for PC purchase, the application for saving vacation, and the application for support of dependents, storage destinations 143A to 143C corresponding to the electronic documents, and candidates 144A to 144C are displayed.

Moreover, the registration result information in the registration result mail is appended data of the registration result mail. Accordingly, the registration result sheets 12A to 12E in the first and second embodiments may be appended, and similarly to the first and second embodiments, the registration result sheets 12A to 12E may be printed by the compound machine 3. In addition, a URL may be described in the registration result mail to display the registration result screen 13A or 13B in the third embodiment, such that the registration result screen 13A or 13B may be displayed from the URL.

The registration result mail ID 140 may be written in a mail text of the registration result mail including header information and the mail text, and may be displayed on the registration result mail screen 14A, as shown in FIG. 23A. In addition, the registration result mail ID 140 may be written in the header information of the registration result mail and displayed on the registration result mail screen 14A.

Next, the user confirms the storage destinations 143A to 143C, to which the electronic documents are registered, on the displayed registration result mail screen 14A. Then, when the user wants to change the storage destination of the electronic document to the candidate or when the user wants to reselect the storage destination and the candidates of the electronic document, he/she creates a return mail that replies to the registration result mail.

Figure 23B:
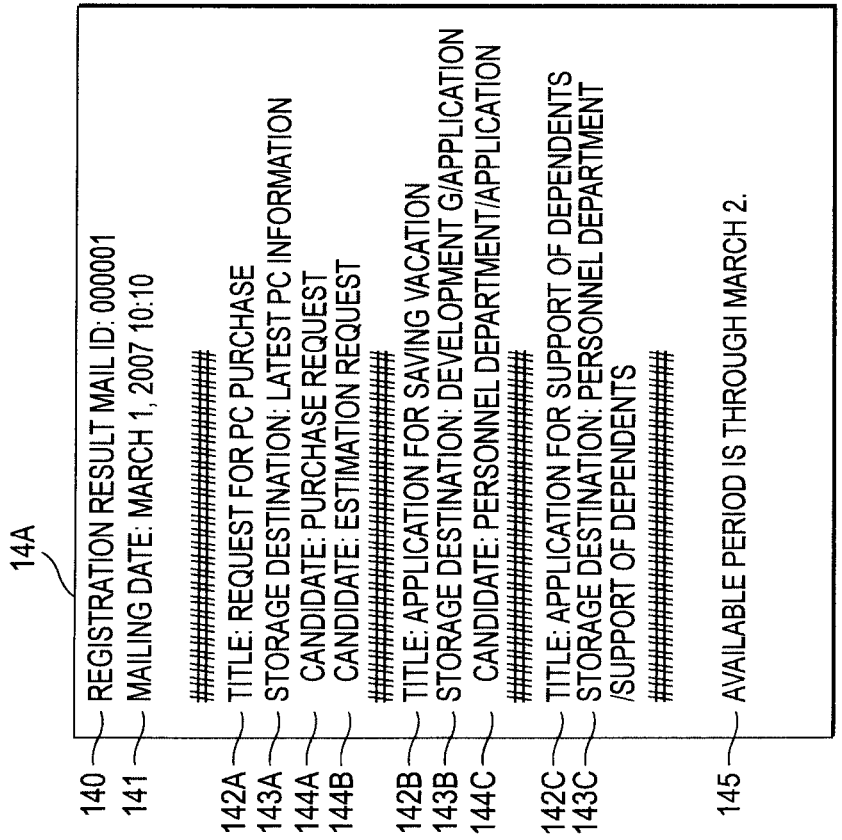
FIG. 23B is a diagram showing an example of a return mail screen.
Figure 24:
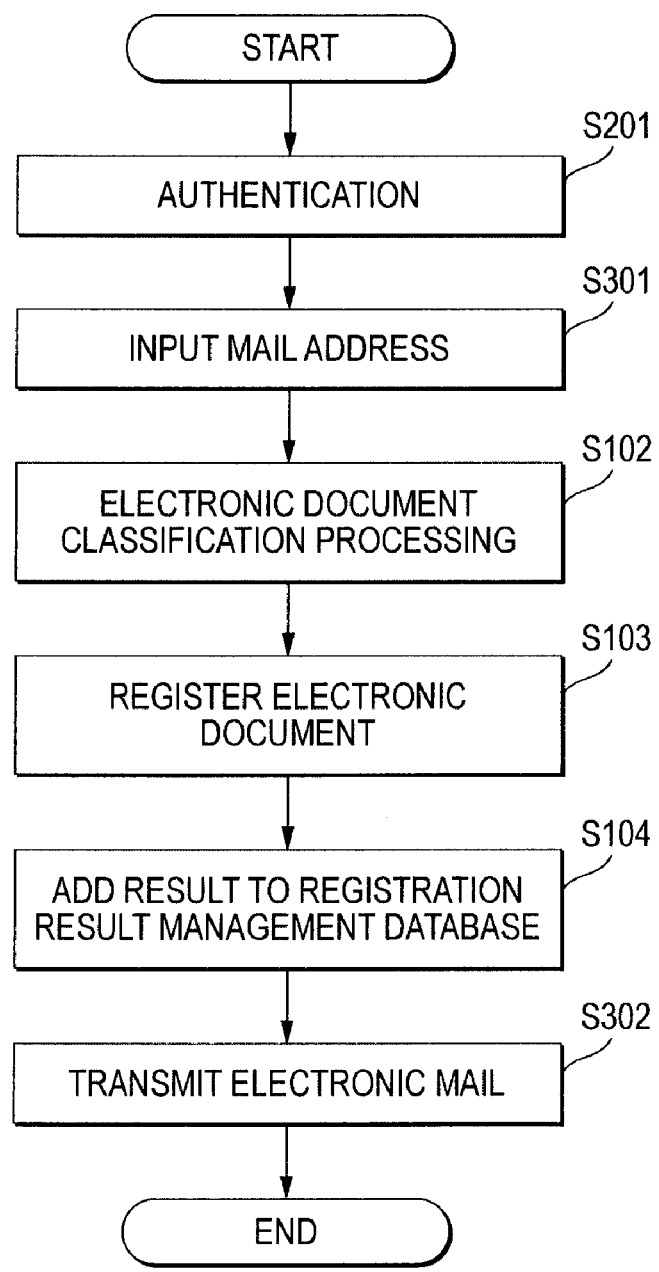
FIG. 24 is a flowchart showing an example of the operation of the document processing system according to the fourth embodiment of the invention when an electronic document is read.
Figure 25:
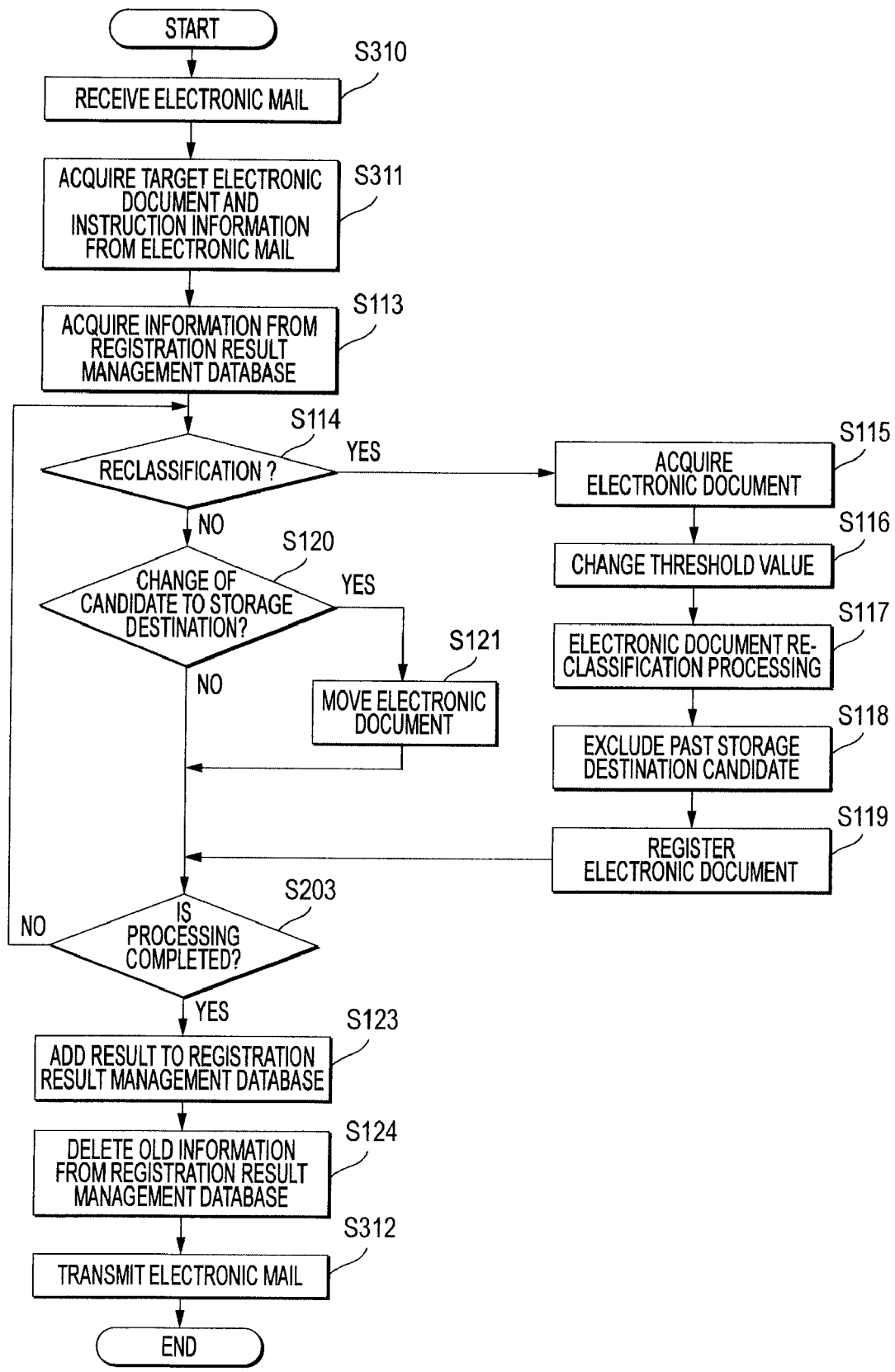
FIG. 25 is a flowchart showing an example of the operation of the document processing system according to the fourth embodiment of the invention when a registration result mail is received.

FIG. 23B is a diagram showing an example of a return mail screen that shows a return mail created by the user. The user edits the registration result mail displayed on the registration result mail screen 14A of FIG. 23A to construct a return mail screen 14B. Similarly to the registration result mail screen 14A, on the return mail screen 14B, a registration result mail ID 140 and a mailing date 141 are displayed. In addition, in a central portion of the return mail screen 14B, a content that is edited to reselect the storage destination of each electronic document or to change the storage destination to the candidate is displayed.

For example, when the user wants to reselect the storage destination and the candidates of the request for PC purchase, the storage destination 143A corresponding to the request for PC purchase displayed on the registration result mail screen 14A, and the candidates 144A and 144B are deleted, while the row that represents the title 142A corresponding to the request for PC purchase remains. In addition, when the user wants to change the storage destination of the application for saving vacation to the candidate 'PERSONNEL DEPARTMENT/APPLICATION', the row that represents the storage destination 143B corresponding to the application for saving vacation displayed on the registration result mail screen 14A is deleted, while the rows that represent the title 142B corresponding to the application for saving vacation and the candidate 144C representing 'PERSONNEL DEPARTMENT/APPLICATION' remain.

Then, if the user instructs to transmit the return mail to the document processing server 2D by the input unit of the terminal 6B, the CPU of the terminal 6B transmits, to the document processing server 2D, the return mail that includes the content displayed on the return mail screen 14B shown in FIG. 23B.

(3) Return Mail Content Reflection

If the arithmetic unit 20 of the document processing server 2D receives the return mail transmitted from the terminal 6B by the communication unit 22 (Step S310), the arithmetic unit 20 of the document processing server 2D analyzes the content of the return mail, and extracts the registration result mail ID, the title, the storage destination, and the candidate from the return mail. Then, the arithmetic unit 20 acquires reselection instruction information and change instruction information of each electronic document on the basis of the extracted title and presence/absence of the storage destination and the candidate (Step S311).

That is, when only the title of the electronic document is included in the return mail, the arithmetic unit 20 determines that the reselection of the electronic document is instructed, and acquires reselection instruction information. In addition, when the title and the candidate of the electronic document are included in the return mail, the arithmetic unit 20 determines that the change of the storage destination of the electronic document to the candidate is instructed, and acquires change instruction information.

Next, the registration unit 202A acquires the storage destination and the candidate from the registration result management table 211*b* with the registration result mail ID and the title extracted by the arithmetic unit 20 as a key (Step S113).

Next, the registration unit 202A determines, on the basis of the acquired reselection instruction information, whether or not to perform storage destination reselection for each electronic document (Step S114). When determining to perform the storage destination reselection (Step S114: Yes), the registration unit 202A acquires the electronic document from the storage destination to which the electronic document is previously registered (Step S115). Then, the registration unit 202A transmits the electronic document to the selection unit 200A and instructs to reselect the storage destination and the candidate.

Next, when receiving the electronic document and the reselection instruction, similarly to the first embodiment, the selection unit 200A changes, by a variation in threshold value in the setting information 212, a threshold value when the storage destination is selected (Step S116), and selects the storage destination and the candidate again (Step S117).

Next, the arithmetic unit 20 excludes the past storage destination and candidate, which are stored in the registration result management table 211b, among the storage destinations and the candidates selected by the selection unit 200A (Step S118). Then, the registration unit 202A moves the electronic document from the storage destination, to which the electronic document is registered, to the storage destination reselected by the selection unit 200A (Step S119).

At Step S114, when determining not to perform the storage destination reselection (Step S114: No), the registration unit 202A determines, on the basis of the acquired change instruction information, whether or not to change the storage destination of the electronic document to the candidate (Step S120).

Then, when the registration unit 202A determines to change the storage destination of the electronic document to the candidate (Step S120: Yes), the electronic documents is moved to the candidate instructed as the storage destination (Step S121).

At Step S120, when determining not to change the storage destination of the electronic document to the candidate (Step S120: No), the registration unit 202A determines whether or not the processing on the acquired reselection instruction information and the change instruction information is completed (Step S203). When the processing is not completed, the process returns to Step S114. Meanwhile, when the processing is completed, the process progresses to Step S123.

Next, the reselection result of the storage destination and the candidate at Steps S117 and S118 is reflected in the registration result management database 211, and the change result of the storage destination to the candidate at Step S121 is added to the registration result management database 211 (Step S123). Then, the registration unit 202A deletes an unnecessary record from the registration result management database 211 (Step S124).

(4) Registration Result Mail Retransmission

The creation unit 201D of the document processing server 2D transmits, to the terminal 6B, a registration result mail including registration result information, in which the reselection result and the change result of the storage destination to the candidate are reflected (Step S312).

Next, when receiving the registration result mail, the CPU of the terminal 6B displays a registration result mail screen on the basis of the registration result mail.

Then, when the user confirms the displayed registration result mail screen, and feels that it is necessary to reselect the storage destination or change the storage destination to the candidate, he/she recreates and transmits a return mail, such that the electronic document is registered to a desired storage location.

Other Embodiments

The invention is not limited to the above-described embodiments, but various modifications may be made without departing from the spirit of the invention. For example, although, in the embodiments, the selection unit, the creation unit, and the registration unit of each of the document processing servers 2A to 2D are implemented with the arithmetic unit and the document processing program, part or all of them may be implemented with hardware, such as an ASIC (Application Specific IC).

Although the document processing system 1 according to each embodiment includes a plurality of devices, the configuration of the document processing system 1 may be freely changed insofar as the document processing system 1 according to each embodiment includes the individual units as a whole. For example, a single device having the individual units may be provided or a plurality of devices having the individual units that are different from each embodiment may be provided.

The program that is used in the embodiments may be read from a recording medium, such as CR-ROM, to the storage unit in the device, or may be downloaded from a server, which is connected to a network, such as Internet, to the storage unit in the device.

The components of the embodiments may be used in combination without departing from the spirit of the invention.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A computer readable medium storing a program causing a computer to execute a process for performing an image processing, the process comprising:
    reading an electronic document;
    acquiring a character string, a layout of a character string, or an image in the electronic document;
    analyzing the electronic document based on a criterion;
    ranking a plurality of storage locations based on the same criterion used to analyze the electronic document;
    automatically selecting a first storage location from among the plurality of storage locations based on the ranking of the storage locations and the analyzed criterion of the electronic document;
    storing the electronic document in the first storage location;
    selecting a second storage location from among the remaining plurality of storage locations, wherein the first storage location and the second storage location are each selected based on the acquired character string, layout or image;
    creating result information including information on the electronic document, the first storage location and the second storage location;
    allowing a user to instruct changing the storage destination of the electronic document from the first storage location to the second storage location; and storing the electronic document in the second storage location on the basis of the instruction.

2. The computer readable medium as claimed in claim 1, the process further comprising:
allowing the user to instruct to select a third storage location, which is different from the first storage location and second storage location;
selecting the third storage location; and
creating result information including the information on the electronic document and the third storage location.

3. The computer readable medium as claimed in claim 1, wherein the second storage information is selected automatically based on the image information generated by reading the document to be stored.

4. The computer readable medium as claimed in claim 1, wherein selecting the first storage location comprises:
receiving the image information;
acquiring a character string, a layout of a character string, or an image in the image information; and
selecting the first storage location based on the acquired character string, layout or image.

5. A document processing apparatus comprising:
a selection unit that, reads an electronic document, acquires a character string, a layout of a character string, or an image in the electronic document, analyzes the electronic document based on a criterion, ranks a plurality of storage locations based on the same criterion used to analyze the electronic document, automatically selects a first storage location from among the plurality of storage locations based on the ranking of the storage locations and the analyzed criterion of the electronic document, and selects a second storage location for the electronic document, wherein the first storage location and the second storage location are each selected based on the acquired character string, layout or image;
a registration unit that stores the electronic document in the first storage location; and
a creation unit that creates result information including information on the electronic document, the first storage location and the second storage location, the result information being used to allow a user to change the storage destination from the first storage location to the second storage location,
wherein,
in a case where the user instructs to change the storage destination, the registration unit stores the electronic document in the second storage location.

6. A document processing system comprising:
a reading unit that reads an original document to be registered as image information;
a selection unit that, acquires a character string, a layout of a character string, or an image in the image information, analyzes the image information based on a criterion, ranks a plurality of storage locations based on the same criterion used to analyze the image information, automatically selects a first storage location from among the plurality of storage locations based on the ranking of the storage locations and the analyzed criterion of the electronic document, and selects a second storage location for the image information, wherein the first storage location and the second storage location are each selected based on the acquired character string, layout or image;
a registration unit that stores the image information in the first storage location;
a creation unit that creates result information including information on the image information, the first storage location and the second storage location, the result information being used to allow a user to change the storage destination from the first storage location to the second storage location; and a printing unit that prints the result information on a medium,
wherein,
in a case where the reading unit reads the medium and the change is instructed on the medium, the registration unit stores the image information in the second storage location.

7. A document processing system comprising:
a reading unit that reads an original document to be registered as image information;
a selection unit that, acquires a character string, a layout of a character string, or an image in the image information, analyzes the image information based on a criterion, ranks a plurality of storage locations based on the same criterion used to analyze the image information, automatically selects a first storage location from among the plurality of storage locations based on the ranking of the storage locations and the analyzed criterion of the electronic document, and selects a second storage location for the image information, wherein the first storage location and the second storage location are each selected based on the acquired character string, layout or image;
a registration unit that stores the image information in the first storage location;
a creation unit that creates result information including information on the image information, the first storage location and the second storage location, the result information being used to allow a user to change the storage destination from the first storage location to the second storage location; and
a display unit that displays the result information created by the creation unit,
wherein,
in a case where the change is instructed on the display, the registration unit stores the image information in the second storage location.

8. A document processing system comprising:
a reading unit that reads an original document to be registered as image information;
a selection unit that, acquires a character string, a layout of a character string, or an image in the image information, analyzes the image information based on a criterion, ranks a plurality of storage locations based on the same criterion used to analyze the image information, automatically selects a first storage location from among the plurality of storage locations based on the ranking of the storage locations and the analyzed criterion of the electronic document, and selects a second storage location for the image information, wherein the first storage location and the second storage location are each selected based on the acquired character string, layout or image;
a registration unit that stores the image information in the first storage location;
a creation unit that creates result information including information on the image information, the first storage location and the second storage location, the result information being used to allow a user to change the storage destination from the first storage location to the second storage location;
a transmitting unit that transmits an electronic mail including the result information created by the creation unit; and
a receiving unit that receives change instruction information,
wherein the registration unit stores the image information in the second storage location.

* * * * *